(12) United States Patent
Shiohara et al.

(10) Patent No.: US 9,830,540 B2
(45) Date of Patent: *Nov. 28, 2017

(54) PRINTING DEVICE AND CONTROL METHOD OF PRINTING DEVICE

(71) Applicant: Seiko Epson Corporation, Tokyo (JP)

(72) Inventors: Susumu Shiohara, Suwa (JP); Toshifumi Yamaji, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/218,664

(22) Filed: Jul. 25, 2016

(65) Prior Publication Data

US 2016/0335527 A1 Nov. 17, 2016

Related U.S. Application Data

(63) Continuation of application No. 14/743,452, filed on Jun. 18, 2015, now Pat. No. 9,424,500, which is a continuation of application No. 14/013,854, filed on Aug. 29, 2013, now Pat. No. 9,092,721.

(30) Foreign Application Priority Data

Aug. 29, 2012 (JP) .................. 2012-189077
Aug. 29, 2012 (JP) .................. 2012-189079

(51) Int. Cl.
 G06F 3/12 (2006.01)
 G06K 15/02 (2006.01)

(52) U.S. Cl.
 CPC ....... *G06K 15/1843* (2013.01); *G06F 3/1205* (2013.01); *G06F 3/1257* (2013.01); *G06F 3/1258* (2013.01); *G06F 3/1285* (2013.01); *G06K 15/024* (2013.01); *G06K 15/1819* (2013.01); *G06K 15/1868* (2013.01); *G06K 15/1878* (2013.01); *G06K 15/1886* (2013.01); *G06K 15/1889* (2013.01)

(58) Field of Classification Search
 None
 See application file for complete search history.

(56) References Cited

U.S. PATENT DOCUMENTS

| 6,337,744 | B1 | 1/2002 | Kuroda |
| 6,362,897 | B1 | 3/2002 | Berg et al. |
| 7,692,834 | B2 | 4/2010 | Matsuzaki |

(Continued)

FOREIGN PATENT DOCUMENTS

| JP | 06-328790 A | 11/1994 |
| JP | 09-048158 A | 2/1997 |

(Continued)

*Primary Examiner* — Dung Tran
(74) *Attorney, Agent, or Firm* — Nutter McClennen & Fish LLP; John J. Penny, Jr.; Santiago Velez

(57) ABSTRACT

A recording device includes a recording unit that performs a recording operation, a first storage unit that stores a first template associated with a recording form, a second storage unit that store a second template corresponding to the first template, and a recording control unit that takes the second template corresponding to the designated first template from the second storage unit and gets the recording unit to perform the recording operation by using the second template when a recording instruction containing data designating the first template is input.

10 Claims, 19 Drawing Sheets

(56) References Cited

U.S. PATENT DOCUMENTS

| | | |
|---|---|---|
| 7,706,014 B2 | 4/2010 | Narusawa et al. |
| 7,847,969 B2 | 12/2010 | Iwanaga et al. |
| 8,064,079 B2 | 11/2011 | Kimura |
| 8,149,453 B2 | 4/2012 | Tanaka et al. |
| 8,214,362 B1 | 7/2012 | Djabarov |
| 8,482,777 B2 | 7/2013 | Yomogisawa |
| 9,001,378 B2 | 4/2015 | Ishii et al. |
| 9,092,721 B2 | 7/2015 | Shiohara et al. |
| 2002/0062283 A1 | 5/2002 | Takahashi |
| 2005/0200896 A1 | 9/2005 | Narusawa et al. |
| 2007/0121164 A1 | 5/2007 | Il |
| 2007/0133045 A1 | 6/2007 | Kubota |
| 2007/0297009 A1 | 12/2007 | Kikuchi |
| 2008/0231901 A1 | 9/2008 | Kurata |
| 2009/0002751 A1 | 1/2009 | Gha et al. |
| 2010/0023746 A1 | 1/2010 | Imamoto |
| 2010/0271661 A1* | 10/2010 | Ogino .................... G06F 3/1205 358/1.15 |
| 2012/0212758 A1* | 8/2012 | Eom ...................... G06F 3/1204 358/1.13 |
| 2013/0188207 A1 | 7/2013 | Shiohara et al. |
| 2013/0265597 A1 | 10/2013 | Shiohara |
| 2014/0063516 A1 | 3/2014 | Shiohara et al. |
| 2015/0286910 A1 | 10/2015 | Shiohara et al. |

FOREIGN PATENT DOCUMENTS

| | | |
|---|---|---|
| JP | 2001-188472 A | 7/2001 |
| JP | 2009-223425 A | 10/2009 |
| JP | 2010-005961 A | 1/2010 |
| JP | 2012-048415 A | 3/2012 |

\* cited by examiner

Label Width, Home Position:C, Xh, Yh

FRAME a1 ⟷ POSITION COORDINATES (X1, Y1), SHAPE, SIZE (W1, H1)
FRAME a2 ⟷ POSITION COORDINATES (X2, Y2), SHAPE, SIZE (W2, H2)
FRAME a3 ⟷ POSITION COORDINATES (X3, Y3), SHAPE, SIZE (W3, H3)
FRAME a4 ⟷ POSITION COORDINATES (X3, Y4), SHAPE, SIZE (W4, H4)

CHARACTER STRING b1 ⟷ "OOOO"
POSITION COORDINATES (X5, Y5), FONT SIZE (fs1)

CHARACTER STRING b2 ⟷ "△△△△"
POSITION COORDINATES (X6, Y6), FONT SIZE (fs2)

CHARACTER STRING b3 ⟷ "□□□□"
POSITION COORDINATES (X7, Y7), FONT SIZE (fs3)

FIG. 2B

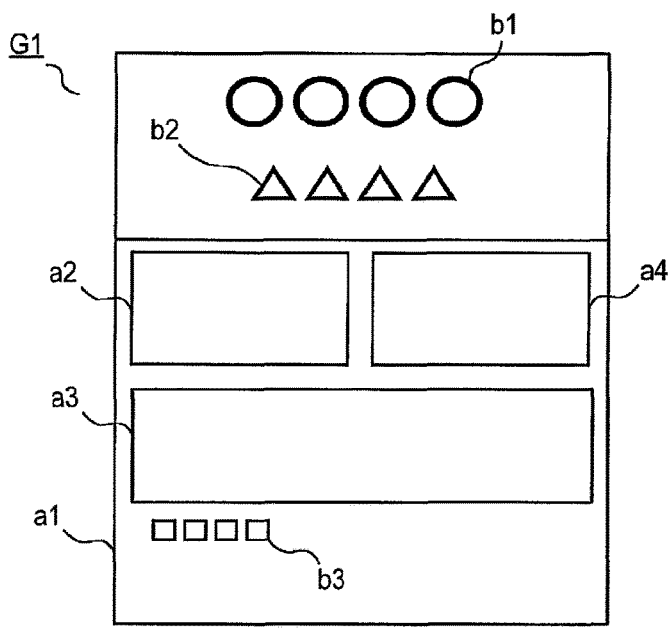

PRINTING DEVICE AND CONTROL METHOD OF PRINTING DEVICE

The present application is a continuation of U.S. application Ser. No. 14/743,452 filed on Jun. 18, 2015, which is a continuation of U.S. application Ser. No. 14/013,854 filed on Aug. 29, 2013, now U.S. Pat. No. 9,092,721 issued Jul. 28, 2015, from which priority under 35 U.S.C. §120 is claimed. Priority is also claimed under 35 U.S.C. §119 to Japanese Patent Application Nos. 2012-189077 filed on Aug. 29, 2012, and 2012-189079 filed on Aug. 29, 2012, which are hereby incorporated herein by reference in their entirety.

BACKGROUND

1. Technical Field

The present disclosure relates to a recording device and a control method of the recording device.

2. Related Art

Heretofore, there is known a system including a recording device which performs recording using templates previously prepared (e.g., see JP-A-2012-048415). Such a recording device performs the recording of a recording material by disposing data inputted from a control-side computer or the like according to the templates stored therein.

In the recording device of the related art, it is conceivable to improve output representation of records, such as a label, by changing the templates. In this instance, since it is necessary that the control-side computer or the like outputs the data suitable for the templates used by the recording device, changing the template is needed to change software of the control-side computer or the like. However, since there are many cases where software is not easily changed, for example, a case where the computer or the like controlling the recording device constitutes a complicated business system, for example, account processing, it is difficult to improve the output representation of the records.

SUMMARY

An advantage of some aspects of the disclosure is to provide a recording device capable of easily changing a recording form and a control method of the recording device.

(1) According an aspect of the disclosure, a recording device includes a recording unit that performs a recording operation, a first storage unit that stores a first template associated with a recording form, a second storage unit that store a second template corresponding to the first template, and a recording control unit that takes the second template corresponding to the designated first template from the second storage unit and gets the recording unit to perform the recording operation by using the second template when a recording instruction containing data designating the first template is input.

According to the configuration of (1), the recording is performed using the second template corresponding to the designated first template if recording instruction designating the first template is input. Accordingly, since a record is recorded in a different recording form without changing the recording instruction inputted to a recording device, it is possible to easily change the recording form of the record.

(2) In the recording device of (1), the first template designates a recording form of data of a recording element, and the second template is made by changing data of a recording element in the first template or by adding data of the recording element to the first template.

According to the configuration of (2), the recording is performed using the second template corresponding to the designated first template if recording instruction designating the first template is input. Accordingly, since a record is recorded in a different recording form without changing the recording instruction inputted to a recording device, it is possible to easily change the recording form of the record.

(3) In the recording device of (2), when the recording instruction containing the data designating the first template is input and the second template corresponding to the designated first template is not stored in the second storage unit, the recording control unit takes the first template and gets the recording unit to perform the recording operation by using the first template.

According to the configuration of (3), since the recording is performed even though there is no second template corresponding to the designated first template, the second template corresponding to all the first templates should not be prepared. For this reason, the recording form can be changed so that the second template is used for only a portion of the first template. Therefore, limitation on the change of the printing form is alleviated, and thus the printing form can be easily changed.

(4) In the recording device of (2) or (3), wherein the second template contains data designating the recording form of the data of the recording element which is newly added to the first template.

According to the configuration of (4), as the template used for the recording is substituted by the template to which the data designating the recording form is newly added, it is possible to further widen a range of output representation, without changing the recording instruction to be input.

(5) In the recording device of (4), wherein the second template contains data designating a recording color of the recording element, as the data designating the recording form of the data of the recording element.

According to the configuration of (5), as the template is substituted by the template to which the data designating the recording color is newly added, it is possible to newly designate the recording color without changing the recording instruction to be input, thereby further widening the range of the output representation.

(6) In the recording device of (4), the second template contains data designating at least one of a position and a size of the recording element in a recording region of a recording medium, as the data designating the recording form of the data of the recording element.

According to the configuration of (6), it is possible to flexibly change the position or the size of the recording element without changing the recording instruction to be input, thereby further widening the range of the output representation.

(7) In the recording device of (1), the first template is data designating a recording form of a page unit, and the second template is formed by adding data newly designating the recording form of the whole page to the first template.

According to the configuration of (7), the recording device performs the recording using the second template corresponding to the designated first template if recording instruction designating the first template is input. Accordingly, since a record is recorded in a different recording form without changing the recording instruction inputted to the recording device, it is possible to easily change the recording form of the record.

(8) In the recording device of (7), when the recording instruction containing the data designating the first template is input and the second template corresponding to the designated first template is not stored in the second storage unit, the recording control unit takes the first template and gets the recording unit to perform the recording operation by using the first template.

According to the configuration of (8), since the recording is performed even though there is no second template corresponding to the designated first template, the second template corresponding to all the first templates should not be prepared. For this reason, the recording form can be changed so that the second template is used for only a portion of the first template. Therefore, limitation on the change of the printing form is alleviated, and thus the printing form can be easily changed.

(9) In the recording device of (7) or (8), the second template contains data designating a background color of the page, as the data newly designating the recording form of the whole page.

According to the configuration of (9), as the template used when recording is substituted by the template to which the data designating the background image of the page of the record is newly added, it is possible to designate the background image of the record, without changing the recording instruction to be input to the recording device, thereby further widening the range of output representation.

(10) In the recording device of (7), the second template contains data designating a background image for a background of the page, as the data newly designating the recording form of the whole page.

According to the configuration of (10), as the template used for the recording is substituted by the template to which the data designating the background color is newly added, it is possible to designate the background color of the record, without changing the recording instruction to be input to the recording device, thereby further widening the range of output representation.

(11) In the recording device of (7), the second template contains data designating a foreground color in the page, as the data newly designating the recording form of the whole page.

According to the configuration of (11), as the template used when recording is substituted by the template to which the data designating the background image of the page of the record is newly added, it is possible to designate the background image of the record, without changing the recording instruction to be input to the recording device, thereby further widening the range of output representation.

(12) According to another aspect of the disclosure, a control method for a recording device including a recording unit that performs a recording operation a first storage unit that stores a first template associated with a recording form, a second storage unit that store a second template corresponding to the first template, and a recording control unit that gets the recording unit to perform the recording operation, includes taking the second template corresponding to the designated first template to get the recording unit to perform the recording operation by using the second template when a recording instruction containing data designating the first template is input.

According to the configuration of (12), the recording is performed using the second template corresponding to the designated first template if recording instruction designating the first template is input to the recording device. Accordingly, since the recording form of the whole page of the record is recorded in a different recording form, without changing the recording instruction inputted to the recording device, it is possible to easily change the recording form of the record.

(13) In the control method of (12), the first template designates a recording form of data of a recording element, and the second template is made by changing data of a recording element in the first template or by adding data of the recording element to the first template.

According to the configuration of (13), the recording is performed using the second template corresponding to the designated first template if recording instruction designating the first template is input to the recording device. Accordingly, since the recording form of the whole page of the record is recorded in a different recording form, without changing the recording instruction inputted to the recording device, it is possible to easily change the recording form of the record.

(14) In the control method of (12), the first template is data designating a recording form of a page unit, and the second template is formed by adding data newly designating the recording form of the whole page to the first template.

According to the configuration of (14), the recording is performed using the second template corresponding to the designated first template if recording instruction designating the first template is input to the recording device. Accordingly, since the recording form of the whole page of the record is recorded in a different recording form, without changing the recording instruction inputted to the recording device, it is possible to easily change the recording form of the record.

(15) The control method of (12) further includes, when the recording instruction containing the data designating the first template is input and the second template corresponding to the designated first template is not stored in the second storage unit, taking the first template and getting the recording unit to perform the recording operation by using the first template.

(16) According to another aspect of the disclosure, a recording device includes a recording unit that performs a recording operation, a storage unit that stores a first template using a first command system and a second template using a second command system and corresponding to the first template, a recording control unit that takes the second template corresponding to the designated first template from the storage unit and gets the recording unit to perform the recording operation by using the second template when a recording instruction containing data designating the first template is input.

(17) In the recording device of (16), when the recording instruction containing the data designating the template using the first command system is input and the template using the second command system corresponding to the designated template using the first command system is not stored in the storage unit, the recording control unit takes the template using the first command system and gets the recording unit to perform the recording operation.

According to the configurations of (16) and (17), the recording is performed using the second template corresponding to the designated first template if recording instruction designating the first template is input to the recording device. Accordingly, since the recording form of the whole page of the record is recorded in a different recording form, without changing the recording instruction inputted to the recording device, it is possible to easily change the recording form of the record.

With the configuration of an embodiment of the disclosure, even though the recording instruction inputted to the recording device is not changed, it is possible to perform the recording using the different recording form, thereby easily changing the recording form of the record.

BRIEF DESCRIPTION OF THE DRAWINGS

FIGS. 2A and 2B are explanatory diagrams illustrating one example of a template for use in the printing system.

DESCRIPTION OF EXEMPLARY EMBODIMENTS

Hereinafter, an embodiment of the present disclosure will be described with reference to the accompanying drawings.

First Exemplary Embodiment

Figure 1:
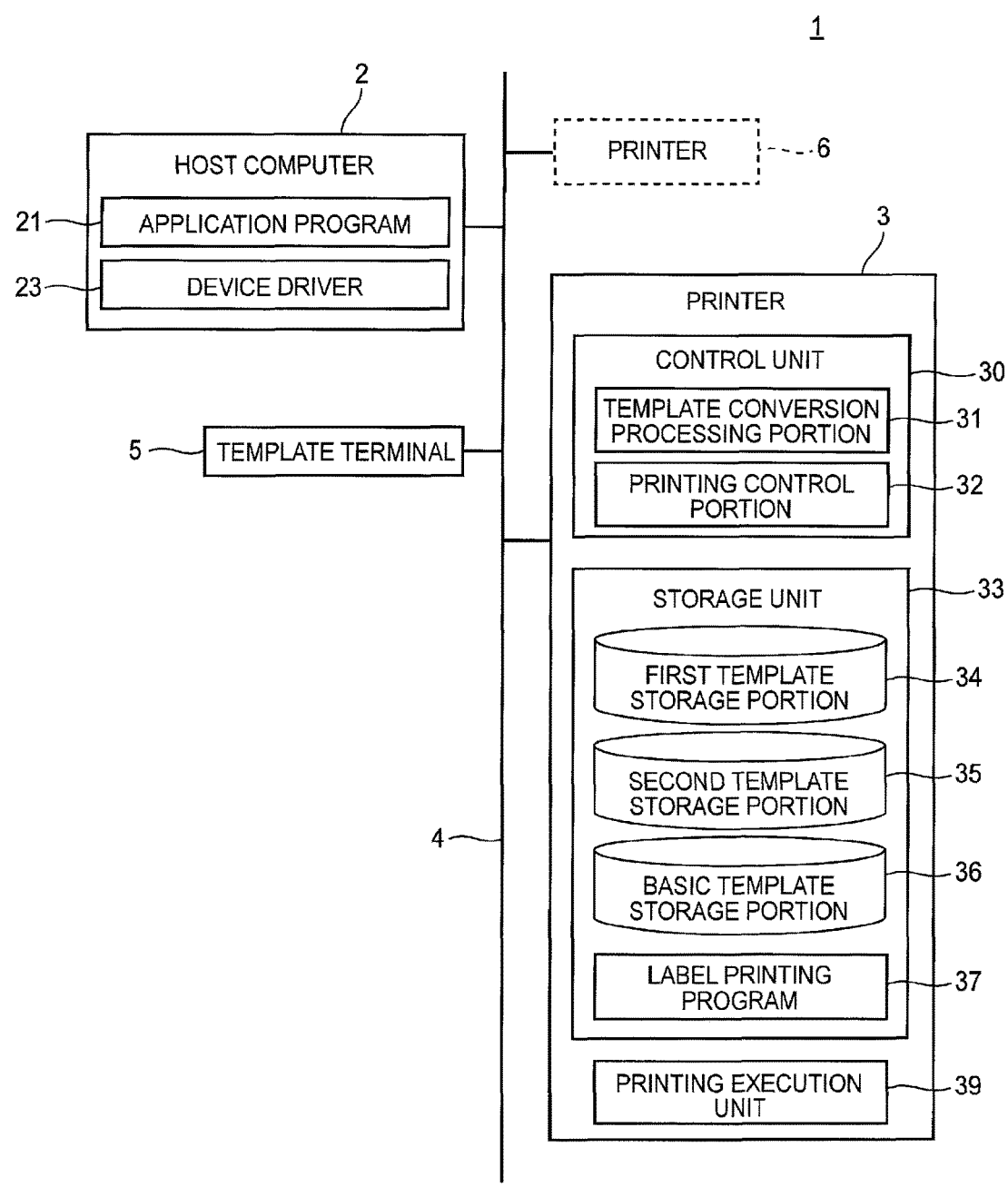
FIG. 1 is a functional block diagram of a printing system according to a first exemplary embodiment.

FIG. 1 is a functional block diagram illustrating the configuration of a printing system 1 according to the embodiment.

As illustrated in FIG. 1, the printing system 1 (recording system) is s system for printing (recording) a label, for example, and includes a host computer 2 outputting a printing command as printing instruction (recording instruction), a printer 3 (recording device), and a template terminal 5, which are connected to each other via a network 4. FIG. 1 shows a printer with no printing system 1, for the sake of explanation. Further, the printing system 1 may include a POS system.

The host computer 2 is a computer composed of a CPU executing a program, an ROM storing a basic control program executed by the CPU or data processed by the CPU, an RAM temporarily storing the program executed by the CPU or the data processed by the CPU, and a non-volatile memory element storing the program or data. The host computer 2 has an application program 21 and a device driver 23, and outputs the printing command to put the printer 6 to print. In this embodiment, a description is given of an example in which the printing system 1 prints characters or images on a printing region of a label paper sheet, which is a recording medium, with an adhesive material on its rear surface to print a cut sheet of a label having a desired cut size.

The application program 21 has a function of designating the template previously stored in the printer 6 and instructing the printing execution. As described later, the printing system 1 is previously set with a plurality of templates to be used for printing, and, for example, the templates are stored in the printer 6. The application program 21 designates the template to be used for printing. The device driver 23 is a program for controlling the printer 6, and is prepared corresponding to hardware specifications and software specifications of the printer 6. If the application program 21 instructs the printing execution, the device driver 23 prepares and outputs printing command which is made of commands of a command scheme (hereinafter referred to as a first command scheme) interpretable by the printer 6. The device driver 23 creates a command including information about the designated template to output it to the printer 6, if the template is designated by the application program 21.

The printing system 1 actually does not include the printer 6. The printing command sent to the printer 6 from the host computer 2 is received and executed by the printer 3. The printer 3 emulates the function of the printer 6, as described later. The printer 3 interprets the printing command written in the first command scheme, and prints the label in a printing format different from the case where the printer 6 prints. That is, the printing system 1 excludes the printer 6 in the system combined with the host computer 2 and the printer 6, and is alternatively connected to the printer 3. In the printing system 1, there is no need to change the application program 21 an the device driver 23 of the host computer 2 from the state in which the printer 6 is used. In this embodiment, a description is given of an example in which the printer 6 performing monochrome printing is substituted by the printer 3 capable of performing color printing.

The network 4 is a network capable of connecting the host computer 2, the printer 3, and the template terminal 5 in a communicable manner, and is composed of, for example, a cable LAN or a wireless LAN specified in Ethernet (trademark) standards.

The host computer 2 and the printer 3 may be connected to each other in a communicable manner via an interface specified in USE or RS-232C standards. In this instance, one-to-one communication between the host computer 2 and the printer 3 is performed in the printing process which will be described later. In the case where the printer 3 is connected to the host computer 2, instead of the printer 6, it is not necessary to change information designating a printer of a communication destination in the host computer 2, if a network address of the printer 3 is set by the same address as that of the network address of the printer 6 before the substitution. Further, in the case where the printer 6 is connected to the host computer 2 via the USB or the RS-232C, it is not necessary to change the information designating the printer of the communication destination in the host computer 2, if the printer 3 is connected to the host computer 2 by the same connection method. In this way, it is possible to substitute the printer by the printer 3, without changing the host computer 2 at all.

The printer 3 includes a printing execution unit (recording unit) 39 having hardware executing the printing, such as a printing head or a transfer roller, and a controller controlling the hardware. The printing execution unit 39 prints the label paper sheet to output the label.

The printer 3 further includes a control unit 30 controlling each part of the printer 3. The control unit 30 includes a template conversion processing portion 31 and a printing control portion (recording control unit) 32. The template conversion processing portion 31 executes a conversion process of the template according to a demand of the template terminal 5. When the printing command including the command of the first command scheme is sent from the host computer 2, the printing control portion (recording control unit) 32 interpreting the command of the printing command to put the printing execution unit to execute the printing (recording).

The printer 3 further includes a storage unit 33 (storage unit) storing the program or data in a nonvolatile manner. A storage region of the storage unit 33 is provided with a first template storage portion 34 (first storage unit) and a second template storage portion 35 (second storage unit) which are able to store the template, and a basic template storage portion 36. Further, the storage unit 33 is stored with a label printing program 37. The label printing program is a program operable in a manner similar to the program which is executed by the controller (not illustrated) of the printer 6, and is used so that the printing control portion 32 emulates the operation of the printer 6.

The template is a set of data designating a printing form (recording form) of the printing medium to be printed by the printer 3 or the printer 6. In this embodiment, a description is given of the case where the label paper sheet is used as the printing medium. The label paper sheet is a paper sheet with labels, which are cut in a desired size and are applied with an adhesive material, arranged on a release sheet long in a horizontal direction, and is accommodated in the printers 3 and 6 while being wound in a roll shape. The printers 3 and 6 print the characters or image of one page on one sheet of label. The printing form may include attributes, for example, a size of label, an internal position of label, the number of characters per one row, the number of lines, decoration of characters, a font size, a font style, a size of image, a position of image, and top and bottom or left and right margin. The template is a set of commands each designating these attributes. That is, the template includes data designating the printing form of the data of recording elements (printing element) which are characters or images to be recorded (printed) on the label.

FIGS. 2A and 2B are explanatory diagrams illustrating one example of the template for use in the printing system, in which FIG. 2A shows an example of information included in a template T1, and FIG. 2B shows an example of a printing image G1 based on the template T1. The printing image based on the template schematically shows the printing form in the case where the label paper sheet is printed according to the template.

As illustrated in FIG. 2A, the template T1 includes a value of "Label Width" which is data designating a width of the label, and coordinates of "Home Position" which is the data designating a reference position. Further, the template T1 includes a plurality of frames (frames a1 to a4) and data designating the printing form of character strings (character strings b1 to b3), as a printing element to be printed on the label. The frames a1 to a4 are regions in which the characters or image can be disposed, and are defined by the position, shape and size (widths W1 to W4 and heights H1 to H4) of the frame, as illustrated in FIG. 2A. The printing position of the frames a1 to a4 are designated by position coordinates (X1 to X4 and Y1 to Y4), the origin point of which is the reference position of the label, in the printing region (recording region) of the label. Further, the frames a1 to a4 are rectangular in the example of FIG. 2A. The rectangular frames a1 to a4 are prescribed in advance so that its width direction and height direction are printed parallel with a width direction and height direction of the label. The position coordinates (X1 to X4 and Y1 to Y4) indicate positions of corners of an upper left side of the frames a1 to a4 in the printing image G1, respectively. What is disposed and printed on the frames can be designated by a separate command. Further, an empty frame may exist in the frames defined by the template T1, and, in this instance, nothing is printed in the region of the frame.

In the example of FIGS. 2A and 2B, the images are disposed in the frames a1 to a4. Since the frames a1 to a4 is rectangular, the rectangular images are printed in the regions of frames a1 to a4 in the printing image G1 of FIG. 2B.

The template T1 may include data of character strings b1 to b3 to be printed on the label, and data designating the printing form of each character string. The example of FIG. 2A includes data of characters "○○○○", "△△△△", and "□□□□" included in the character strings for the character strings b1 to b3, data designating printing positions (position coordinates X5 to X7 and Y5 to Y7) as the printing form of the character strings b1 to b3, and data designating font sizes fs1 to fs3.

Further, the contents of the template illustrated in FIGS. 2A and 2B can be dynamically changed. That is, it is possible to insert and print characters or images in the frames contained in the existing template, or to add and print other characters or images at a position which is not defined by the frame or the character string in the template.

The first template storage portion 34 of the printer 3 is stored with the first template composed of the commands of the first command scheme.

The first template is the template illustrated in FIGS. 2A and 2B which is described using the commands of the first command scheme. The first template is a template for use in the printing of the printer 6. For example, when the printer 6 is substituted by the printer 3, all templates used by the printer 6 is copied in the first template storage portion 34.

The second template storage portion 35 is stored with the second template described by the command which is defined by the second command scheme different from the first command scheme. That is, the second template is the template illustrated in FIGS. 2A and 2B which is described by the command of the second command scheme. The second command scheme may contain a command common to or uncommon to the first command scheme. Further, the second command scheme contains a command regarding to an attribute which is not defined in the first command scheme, as the command designating the printing form.

In this embodiment, the first command scheme is composed of commands for monochrome printing, and a printing color (recording color) of the printing elements is limited to a black or gray scale. Whereas, the second command scheme contains a command designating the printing color of the printing elements to correspond to color printing of 16, 256, 65,536, or 16,770,000 colors. The printing color of the printing elements can be designated using these commands, except for the black or gray scale.

The second template stored in the second template storage portion 35 corresponds to any one of the templates stored in the first template storage portion 34, and is composed to print the label in a printing form of which at least a portion is different from the first template. Specifically, the second template is a template of which at least a portion of the data designating the printing elements of the first template and the attribute of the printing element is changed, added, or deleted.

In this embodiment, the first template and the second template are denoted by a name, respectively, and the second template is denoted by the same names as those of the first template. That is, the first template storage portion 34 and the second template storage portion 35 are stored with the template of the same name. Herein, for the whole of the first template stored in the first template storage portion 34, the second template denoted by the same name is not necessarily stored in the second template storage portion 35. For example, for any one of the first templates stored in the first template storage portion 34, it is allowed that the second template denoted by the same name is not stored.

The basic template storage portion 36 is stored with the basic template which is used by the printer 3 as a template of default. The host computer 2 outputs printing command which does not contain the information designating the template. If the printing control portion 32 receives the printing command, the printing control portion 32 arranges the characters or images according to the basic template stored in the basic template storage unit 36.

The template terminal 5 is composed of, for example, a personal computer as a terminal device for editing the template designating the printing form of the label.

Figure 3:
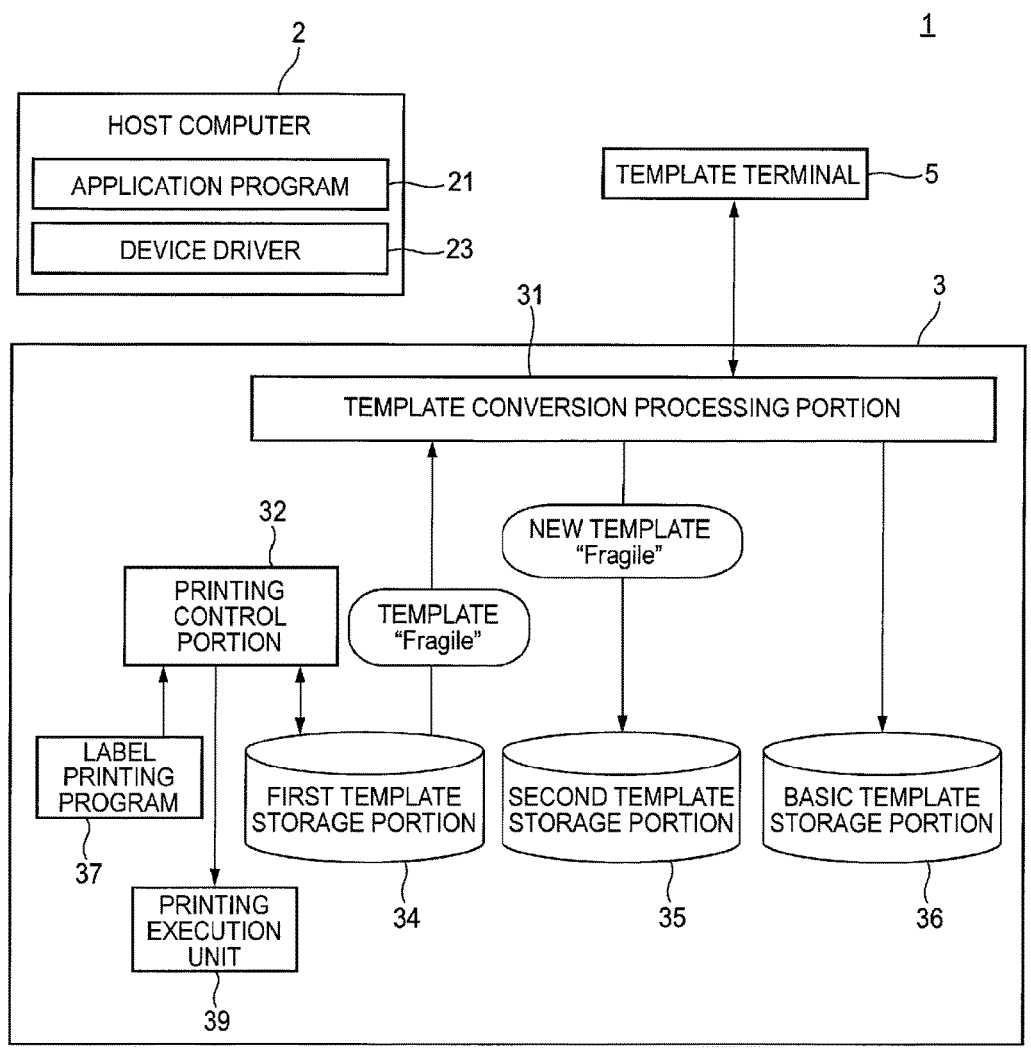
FIG. 3 is an explanatory diagram illustrating an operation of a template conversion process.
Figure 4:
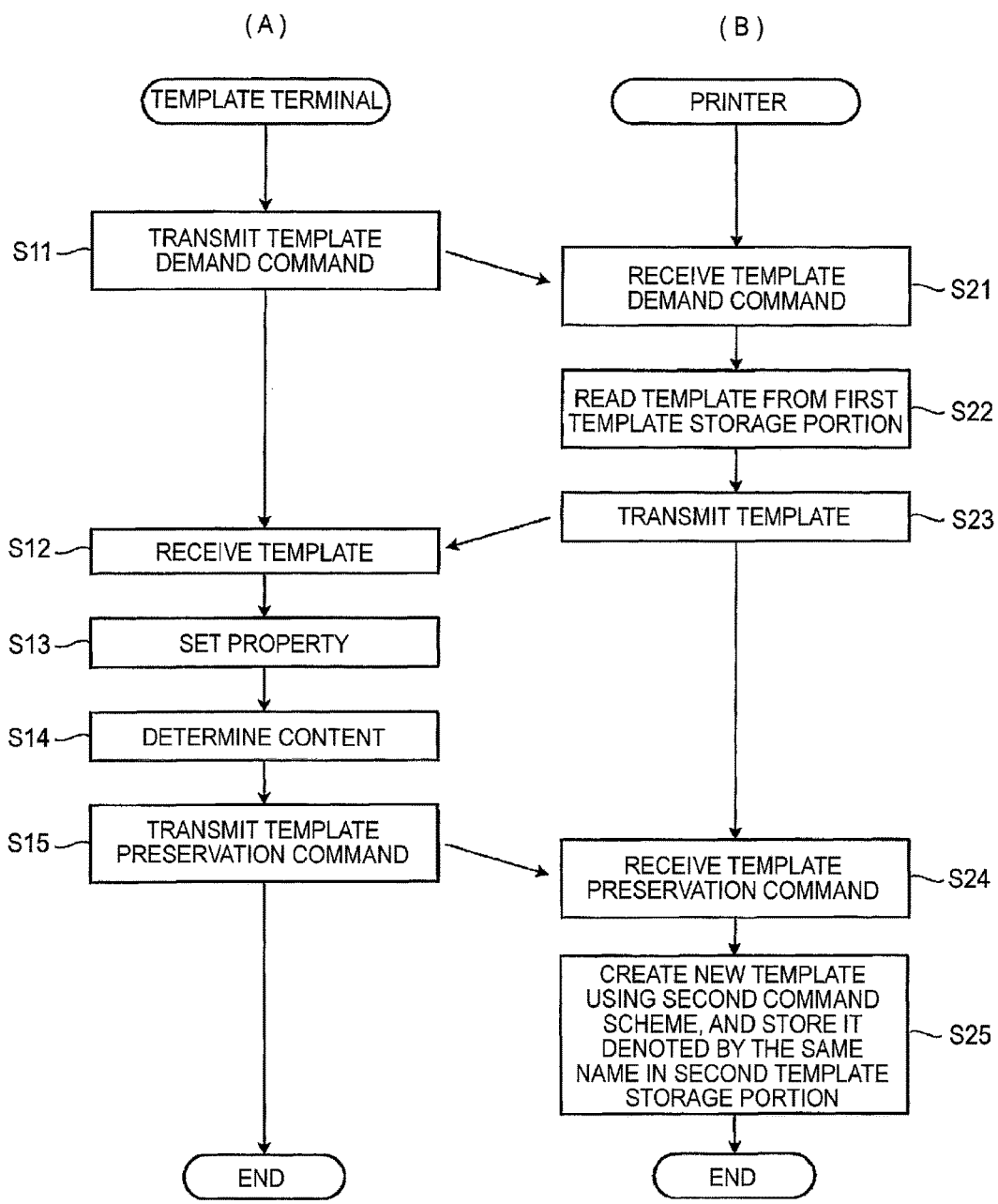
FIG. 4 is an explanatory diagram illustrating a sequence of the template conversion process.

FIG. 3 is an explanatory diagram illustrating the operation of the template conversion process, and schematically shows the flow of the data in the printing system 1. Further, FIG. 4 is an explanatory diagram illustrating a sequence of the template conversion process, in which FIG. 4A shows the operation of the template terminal 5, and FIG. 4B shows the operation of the template conversion processing portion 31 of the printer 3. The template conversion process will now be described with reference to FIGS. 3 and 4.

In the template conversion process, the template terminal 5 and the printer 3 transmit and receive the data to and from each other. The template conversion processing portion 31 executes, for example, the function of a web server, and the template terminal 5 executes, for example, the function of a web client. In this instance, the template conversion processing portion 31 transmits the data of a web page for the template process in response to the access of the template terminal 5, and the template terminal 5 transmits a request to the printer 3 based on the web page. In this instance, the function of the template terminal 5 may be added to the printer 5.

By manipulation of a user or operation of a preset program, the template terminal 5 transmits a template demand command for demanding transmittance of the first template to the template conversion processing portion 31 of the printer 3 (step S11). The template terminal 5 may demand transmittance of any one of the first templates stored in the first template storage portion 34, or demand transmittance of all the first templates. The template conversion processing portion 31 of the printer 3 receives the template demand command transmitted from the template terminal 5 (step S21). The template conversion processing portion 31 reads the first template demanded for the transmittance in the template demand command from the first template storage portion 34 (step S22), and transmits it to the template terminal 5 (step S23). As illustrated in FIG. 3, the first template denoted by a name "Fragile" is transmitted to the template terminal 5 by way of example herein.

The template terminal 5 receives the first template transmitted from the printer 3 (step S12). As necessary, the template terminal 5 exchanges the data of the printing element (data of characters or data of images) by data of other printing element, or adds the data of the printing element. In addition, the attribute which is not defined in the first template is additionally set (step S13). For example, the template terminal 5 additionally sets the attribute, for example, whether or not color printing is performed for each data of the printing elements in the first template.

If the set content of the attribute to be added to the first template being processed is determined (step S14), the template terminal 5 transmits a template preservation command for making the printer 3 to preserve a new template containing the attribute (step S15). In step S15, the template terminal 5 transmits the data (containing the command) of the attribute to be newly added to the command constituting the first template to the printer 3 together with the template conversion command. Further, in step S15, the template terminal 5 may transmit it together with the processed first template which is subjected to the process of setting the attribute. In the case of editing or exchanging the data of the printing element, the template terminal 5 transmits it together with the data of the processed printing element.

The template conversion processing portion 31 of the printer 3 receives the template conversion command transmitted from the template terminal 5 (step S24). The template conversion processing portion 31 creates and preserves the second template by the command defined by the second command scheme, based on the data transmitted together with template preservation command from the template terminal 5 (step S25). Specifically, the template conversion processing portion 31 creates the second template which describes the printing form using the command of the second command scheme, the printing form being reflected by the attribute added or changed by the process of the template terminal 5 to or changed from the printing form of the first template which is processed by the template terminal 5. Further, in the case where the data of the printing element is transmitted together with the preservation demand for the template, the template conversion processing portion 31 creates the second template containing the data of these printing elements, and the data designating the printing form of the data. The template conversion processing portion 31 denotes the created second template by the same name as the first template processed by the template terminal 5, and stores it in the second template storage portion 35. Accordingly, it becomes clear that the second template created by the template conversion processing portion 31 in step S25 is the template to be used instead of the first template processed by the template terminal 5.

Now, the first and second templates in a corresponding relation and an example of printing images based on these templates will be described.

Figure 5:
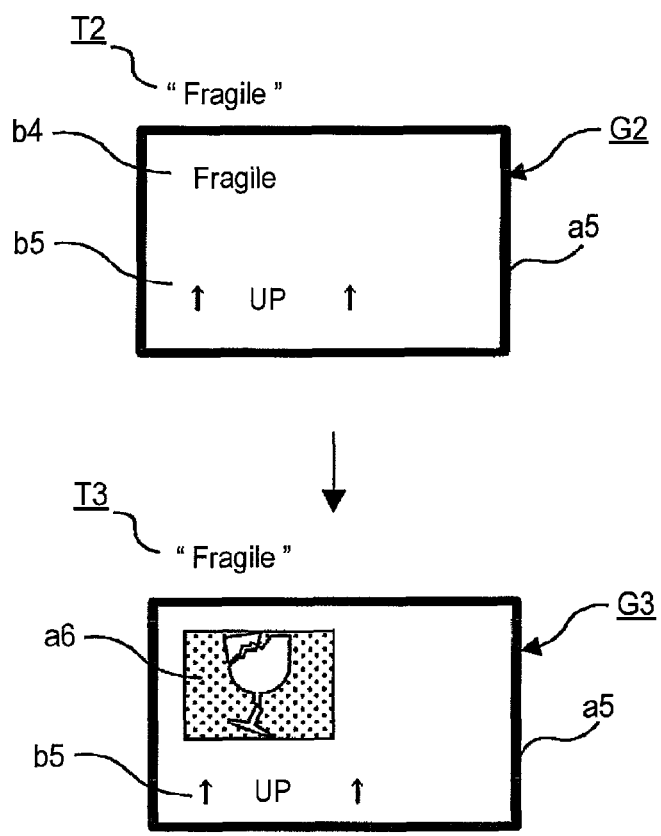
FIG. 5 is an explanatory diagram illustrating one example of first and second templates.

FIG. 5 is an explanatory diagram illustrating one example of the first template T2 and the second template T3 in the corresponding relation, and shows printing images G2 and G3 based on the first template T2 and the second template T3.

The printing image G2 based on the first template T2 denoted by the name of "Fragile" has a printing element which is a rectangular frame a5, a character string b4 of "Fragile" disposed in the frame a5, and a printing element which is a character string b5 of "↑ UP ↑". The first template T2 contains the data of the frame a5 and the character strings b4 and b5, and the data designating the printing form. In this instance, the first template T2 is composed of commands of the first command scheme which designate the printing form for the monochrome printer 6, and does not contain the data designating the printing color of the frame a5 and the character strings b4 and b5.

The second template T3 denoted by the same name of "Fragile" as the first template T2 exchanges the character string b4 of the first template T2 by an image a6 attracting attention to a fragile object. Further, the second template T3 is added by the data designating the printing color of the image a6. The printing color may be, for example, a red color suitable for the caution. The printing image G3 based on the second template T3 is formed so that the color image a6 is printed, while the character "Fragile" is omitted as compared with the printing image G2.

As the template terminal 5 converts the first template used by the printer 6 into the second template described by the command of the second command scheme which can be executed by the printer 3, and then prerserves it in the printer 3, the printer 3 can employ the function of the color printing or the like, which cannot be executed by the printer 6.

Figure 6:
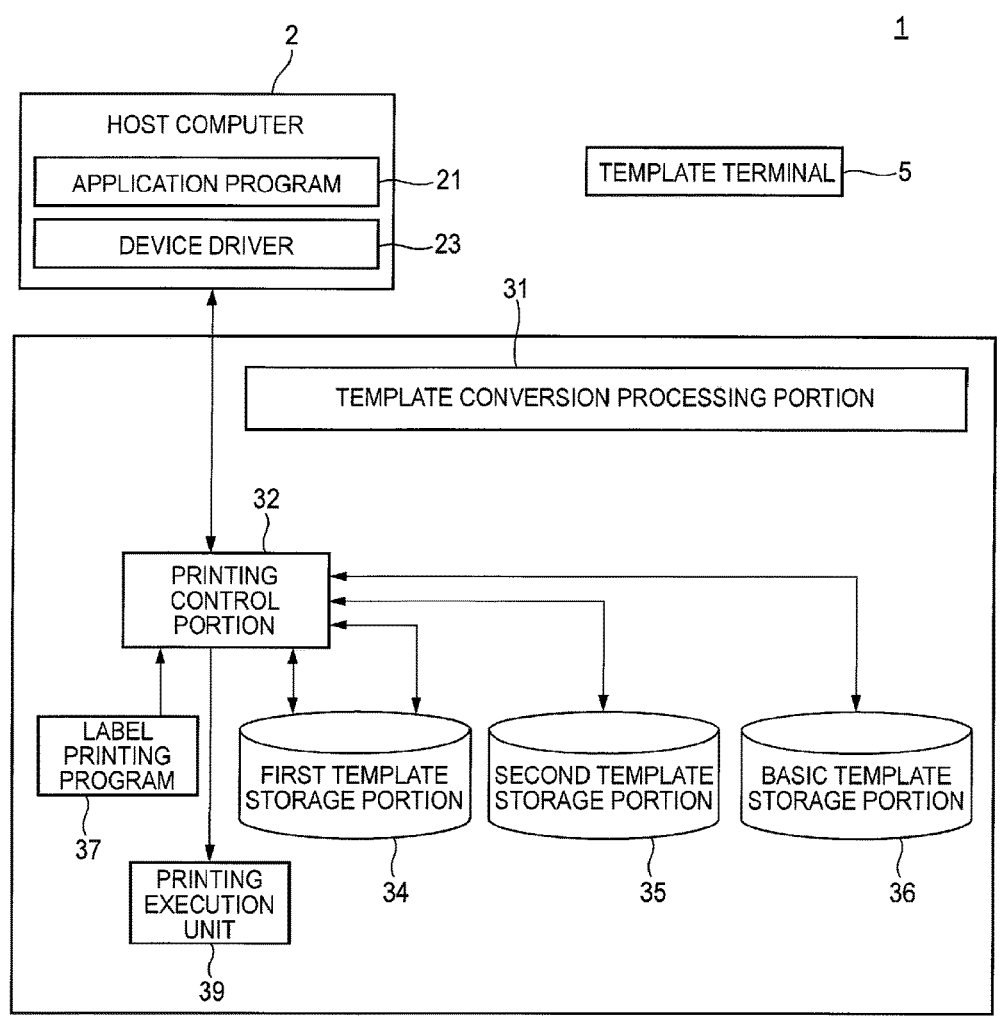
FIG. 6 is an explanatory diagram illustrating an operation of a printing process.
Figure 7:
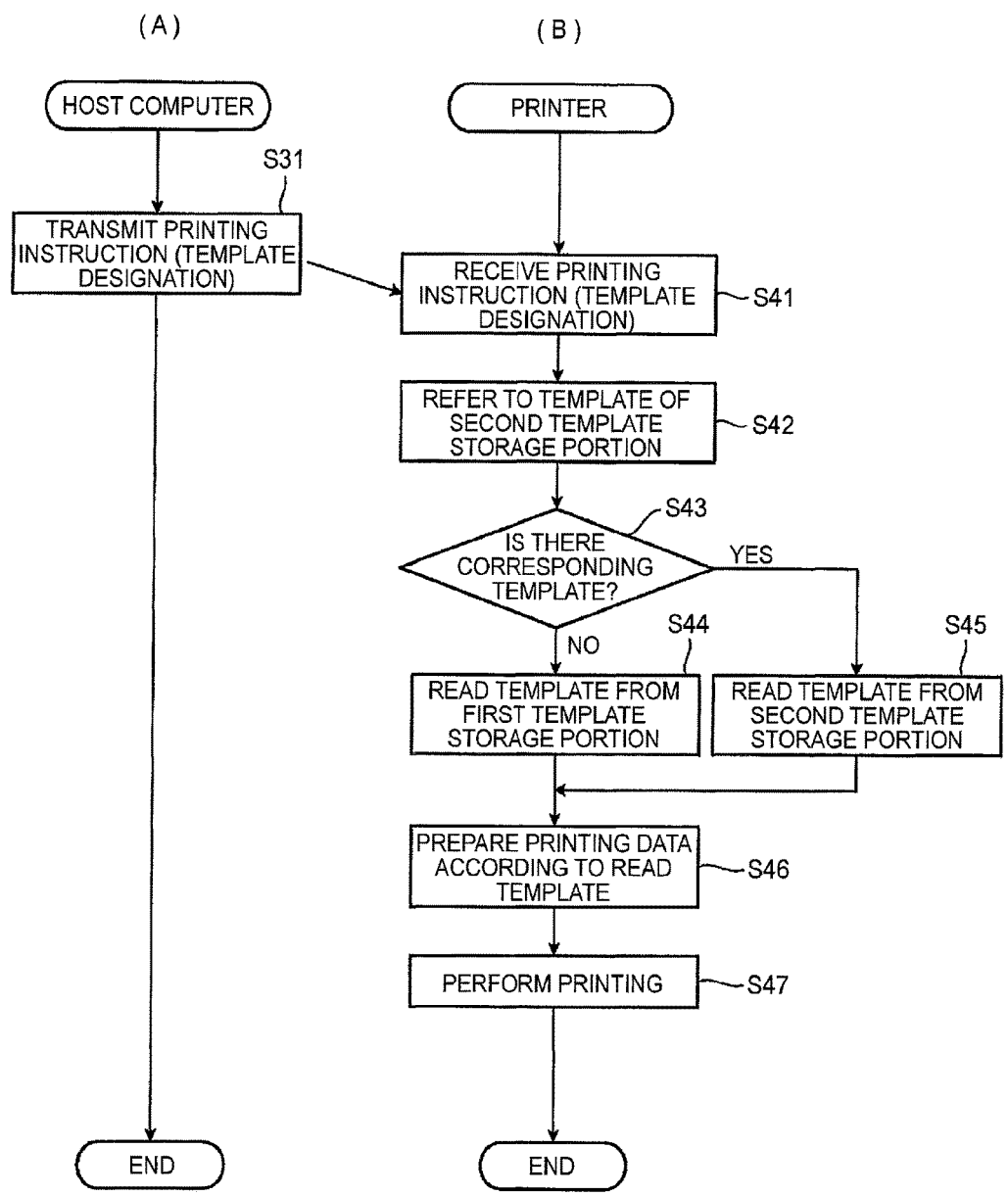
FIG. 7 is an explanatory diagram illustrating a sequence of the printing process.

FIG. 6 is an explanatory diagram illustrating the operation of the printing process, and schematically shows the flow of the data in the printing system 1. Further, FIG. 7 is an explanatory diagram illustrating a sequence of the printing process, in which FIG. 7A shows the operation of the host computer 2, and FIG. 7B shows the operation of the printing control portion 32 of the printer 3. The printing process will now be described with reference to FIGS. 6 and 7.

In the printing process, the host computer 2 and the printer 3 transmit and receive the data to and from each other. In a case where the host computer 2 and the printer 3 are connected one-on-one via a communication line, such as USB or RS-232C, the printing process is executed via the communication line.

As the host computer 2 executes the application program 21 by the manipulation of the user or the operation of the preset program, the printing process starts. If the application program 21 creates the printing data of the label and instructs the printing execution, the printing command contained the data designating the first template based on the first command scheme is created and transmitted to the printer 3 by the device driver 23 (step S31). In this instance, if the data of the printing element is added to the first template, the data of the printing element to be added is contained in the printing command.

The printing control portion 32 of the printer 3 receives the printing command transmitted from the host computer 2 (step S41). The printing control portion 32 refers to the data of the second template stored in the second template storage portion 35 (step S42), and verifies whether or not the second template storage portion 35 is stored with the second template corresponding to the first template designated by the printing command (step S43). That is, the printing control portion 32 searches whether the second template having the same name as the template contained in the printing command is in the first storage portion 35.

If the concerned second template is not in the second template storage portion 35 (NO in step S43), the printing control portion 32 reads the designated first template from the first template storage portion 34 (step S44), and proceeds to step S46. If there is no concerned first template in the first template storage portion 34, the printing control portion 32 may read the basic template from the basic template storage portion 36. Further, if it is verified that the concerned second template is in the second template storage portion 35 (YES in step S43), the printing control portion 32 reads the second template from the second template storage portion 34 (step S45), and proceeds to step S46.

In step S46, the printing control portion 32 creates the printing data according to the read template. For example, if the first template designated in the printing command is denoted by the name of "Fragile", the template having the same template name "Fragile" is read from the second template storage portion 35, and the printing data is created. As described above, the read second template is that the data of the character string b4 of "Fragile" in the first template is substituted by the data of the color image (recording element) a5.

In steps S42 to S46, the printing control portion 32 converts the command of the first command scheme which is the command scheme of the printer 6 into the command of the second command scheme which is the command scheme of the printer 11, and operates as an emulator for controlling the recording of the printer 11.

Subsequently, the printing control portion 32 controls the printing execution unit 39 to execute the printing of the label based on the printing form designated by the second template (step S47).

As described above, if the printing command designating the first template is input, the printer 3 performs the printing based on the second template corresponding to the first template. That is, at the time of printing, the printer 3 substitutes the first template designated in the printing command for the printer 3 by the second template, and then performs the printing. Since the second template is a template of which the first template T2 is subjected to at least one of change, addition, and deletion, the printer 3 can perform the recording in a printing form different from the printing form based on the first template. For this reason, as the printer 6 is substituted by the printer 3, the printing form of the label can be easily changed using the function which is not provided in the printer 6, without changing the printing command to be output from the host computer 2.

If there is no second template corresponding to the first template designated by the host computer 2, the printer takes the designated first template for the recording, thereby implementing the printing even with no the second template corresponding to the designated first template. Therefore, it does not need to prepare the second template corresponding to all the first templates. For this reason, the recording form can be changed so that the second template is used for only a portion of the first template. Therefore, limitation on the change of the printing form is alleviated, and thus the printing form can be easily changed.

In addition, an example in which the second template T3 is contained with the data designating the printing color as the data designating the printing form of the data of the image a6 is illustrated. The printing system 1 substitutes the template used in the printing by the second template to which the data designating the printing color is newly added. Thereby, it is possible to designate the printing color without changing the printing instruction outputted from the host computer 2. Accordingly, it is possible to widen a range of the output representation, without changing the software configuration of the host computer 2. Like this embodiment, for example, as the second template is used instead of the first template corresponding to the monochrome printer 6, it is possible to widen the range of the output representation by colorization, without changing the printing command to be input.

The second template contains the data designating at least one of the position and size of the data, such as the frame a5, the image a6, and the character string b5, in the printing region having the label which is the printing medium. For this reason, since the arrangement and size of the frame a5, the image a6, and the character string b5 is flexibly changed by substituting the template used for the printing by the second template, the range of the output representation can be further widened.

Although one example of the first and second templates has been described with reference to FIG. 5 in the above description, the present disclosure is not limited thereto. Another example of the first templates and an example of a second template corresponding to each first template will be described with reference to FIGS. 8 to 12.

Figure 8:
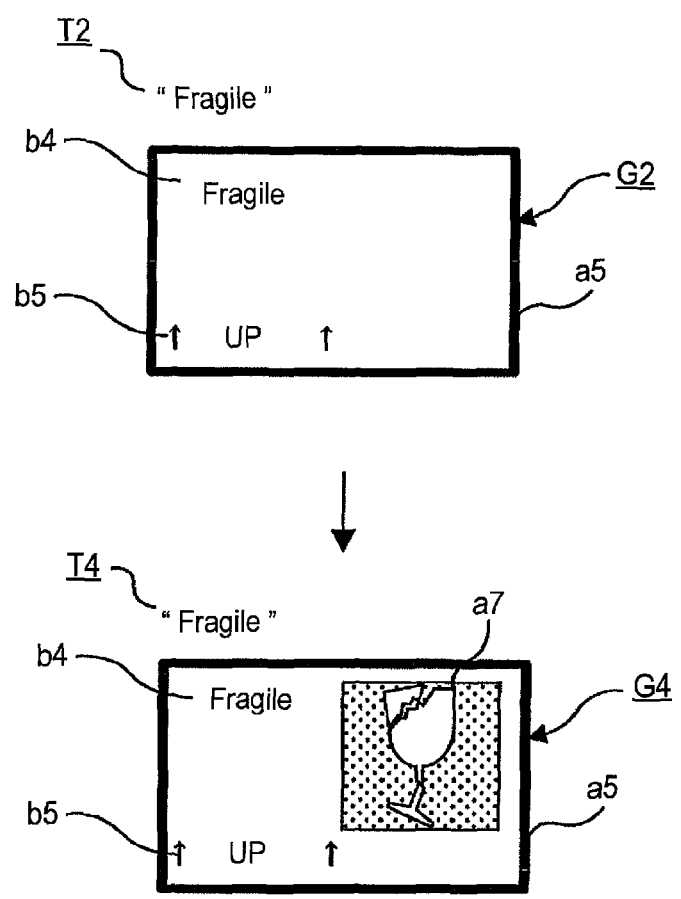
FIG. 8 is an explanatory diagram illustrating one example of first and second templates.

FIG. 8 illustrates printing images G2 and G4 each corresponding to a first template T2 and a second template T4 which corresponds to the first template T2. The first template T2 and the printing image G2 in this example are identical to those which have been described with reference to FIG. 5.

The second template T4 is that the printing element of the first template T2 is added by data of an image a7 attracting attention to a fragile object, as a printing element, and also is added by the data designating the printing form (printing color and printing position) of the image a7. The position of the image a7 is designated by a position which is not overlapped with the character string b4 or the character string b5.

For this reason, the printing image G4 based on the second template T4 is disposed with the color image a7 which is not provided in the printing image G2.

The second template T4 illustrated in FIG. 8 contains the data of the image a7 and the data designating the printing form which are newly added to the first template T2. For this reason, as the first template T2 designated in the printing command outputted from the host computer 2 is substituted by the second template T4, the image is added to widen the range of the output representation.

Figure 9:
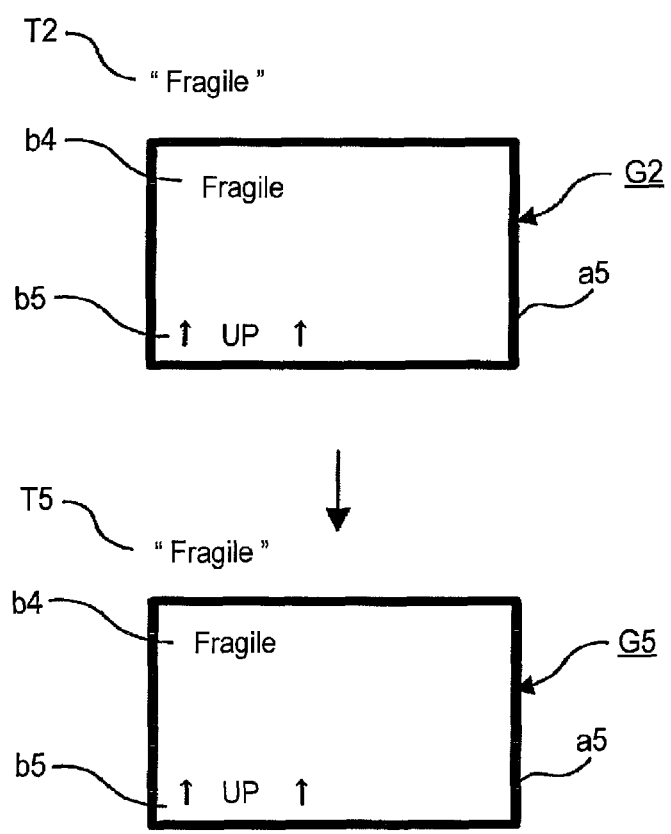
FIG. 9 is an explanatory diagram illustrating one example of first and second templates.

FIG. 9 illustrates the printing images G2 and G5 each corresponding to the first template T2 and a second template T5 which corresponds to the first template T2. The first template T2 and the printing image G2 in this example are identical to those which have been described with reference to FIG. 5.

The second template T5 is that the first template T2 is added by data designating the printing color of the character string b4. For this reason, the printing image G5 printed based on the second template T5 is that the character string b4 of the monochrome printing image G2 is colored by the designated color, such as red or blue.

Figure 10:
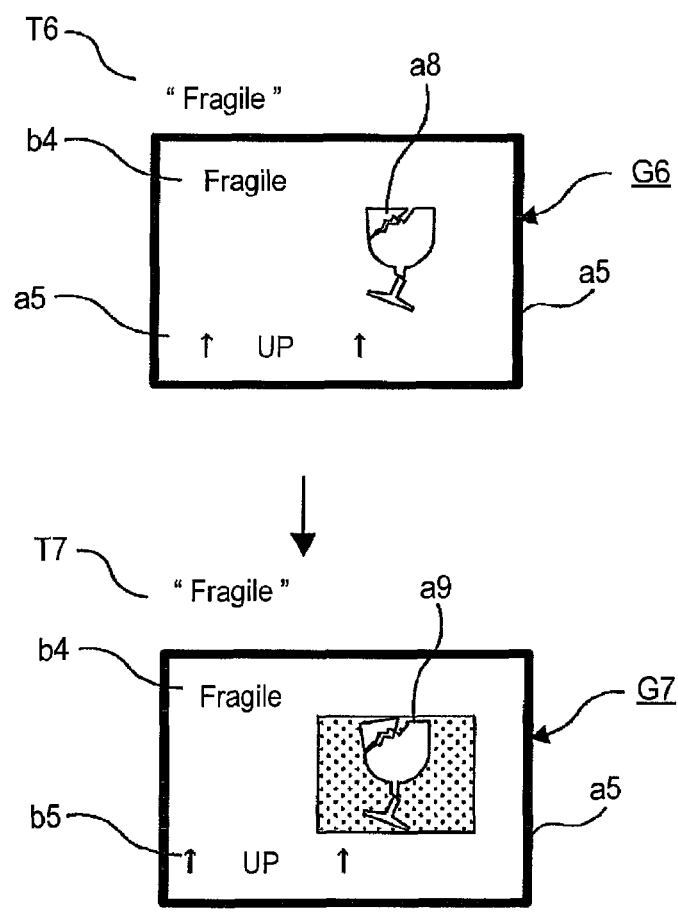
FIG. 10 is an explanatory diagram illustrating one example of first and second templates.

FIG. 10 illustrates the printing images G6 and G7 each corresponding to a first template T6 and a second template T7 which corresponds to the first template T6.

The first template T6 is that the first template T2 described with reference to FIG. 5 is added by data (data of printing element) of an image a8 attracting attention to a fragile object, and data designating the printing form. The first template T6 is not contained with the data designating the printing color.

Further, the second template T7 corresponding to the first template T6 contains data designating the printing color of the data of the image a8.

The printing image G7 based on the second template T7 is that the monochrome image a8 in the printing image G6 based on the first template T6 is colorized to form an image a9.

As illustrated in the examples of FIGS. 9 and 10, the second templates T5 and T7 are that a portion of the data of the printing element in the first templates T2 and T6 are newly added by data designating the printing form which is not provided in the first templates T2 and T6. According to these examples, it is possible to further widen the range of the output representation by using the second templates T5 and T7, instead of the first templates T2 and T6 designated by the printing command outputted from the host computer 2 to the printer 6.

In FIGS. 7 to 10, the second template is that the corresponding first template is subjected to change, addition, and deletion of the data designating the printing form of the printing element, but the present disclosure is not limited to these examples.

Figure 11A:
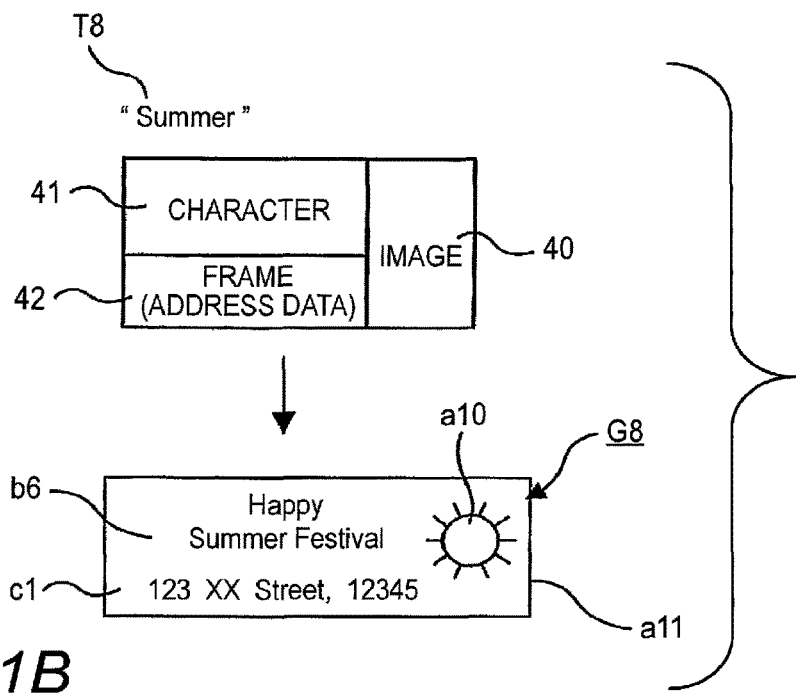
FIGS. 11A and 11B are explanatory diagrams illustrating one example of first and second templates.
Figure 11B:
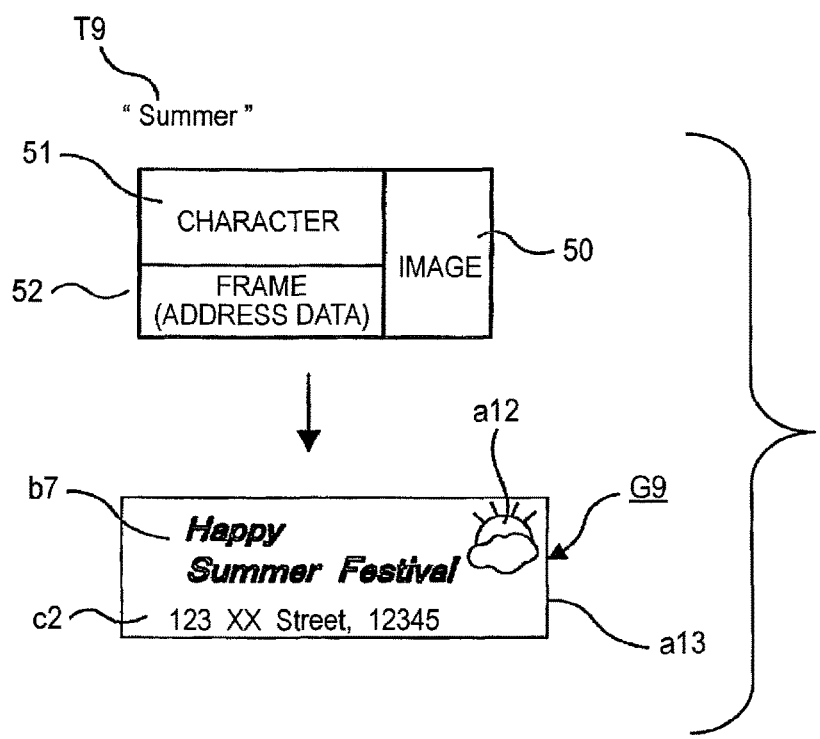

FIGS. 11A and 11B are explanatory diagrams illustrating printing images G8 and G9 each corresponding to a first template T8 (FIG. 11A) and a second template T9 (FIG. 11B) corresponding to the first template.

The first template T8 of FIG. 11A contains an image 40, a character 41, and a frame 42 as the printing elements to be printed on the label. The data of the first template T8 contains image data of the image 40, data designating a size and position of the image 40, and a character code, a font, a size, and a position of the character 41. Further, the frame 42 is provided as a frame to insert the characters. The data of the first template T8 does not contain the data, that is, character code, of the character to be inserted in the frame 42, but the frame 42 contains the data designating the font, the size and the position of the character.

If the first template is used, the host computer 2 outputs data designating a name of the first template, and data containing the character code of the character to be inserted in the frame 42, as well as a command of printing command. In the example of FIG. 11A, the address data can be inserted in the frame 42, so that the host computer 2 outputs a name "Summer" of the first template T8, and the address data "123 XX Street, 12345" to be inserted in the frame 42, as well as the printing command.

The second template T9 corresponding to the first template T8 contains an image 50, a character 51, and the frame 42 as the printing elements, as illustrated in FIG. 11B. The data of the second template T9 contains image data of the image 50, data designating a size and position of the image 50, and a character code, a font, a size, and a position of the character 51. Further, the image 50 is the image data substituting the image 40, and the character 51 is the data substituting the character 41. If the image 50 and the character 51 is able to be disposed in the range falling within the size of the label, it is not necessary to arrange the image 40 and the character 41 in the size, the position, and the font, and an arbitrary size, position and font can be set.

Since the printer 3 is able to perform color printing, the second template T9 contains the data designating the printing color of the image 50, and the data designating the printing color of the character 51.

In addition, the second template T9 contains the frame 52 as the printing element. The frame 52 is a frame in which it is disposed at the same size and position of the frame 42 of the first template T8, and a character can be inserted. The frame 52 which is inserted by the same number of characters as that of the fame 42 can be printed. Accordingly, if the host computer 2 outputs the data of the name of the first template T8 and the character to be inserted in the frame 42, the printer 3 can print the frame 52 in which the entire characters (herein, address data) to be inserted in the frame 42 are inserted. In this way, for the frame in which the data is dynamically inserted or changed by the data outputted from the host computer 3 together with the printing command, the second template 2 preferably has the frame in which at least the same data as the first template. Furthermore, the character or image stationarily contained in the template may be changed in the frame without deviating from the printing region of a printing surface of the label. For example, if the printing image G8 has a size occupying the half of the label, the printing size of the printing image G9 may be set to be the almost entire surface of one sheet of the label.

Comparing the printing image G8 of the first template T8 and the printing image G9 of the second template T9, the image a10 and the image a12, and the character b6 and the character b7 may be largely different from each other. The character c2 is not necessarily set to have the same font or size as that of the character c1, and may be set in different font or size, since the same number of characters should be printed.

The work of preparing the second template using the template terminal 5 can be carried out by two methods: a method of reading the first template using the template terminal 5; and a method of preparing a new template without using the first template. In the example illustrated in FIGS. 11A and 11B, the character 41 or the image 40 can be changed by the character 51 or the image 50 which is largely different from the character 41 or the image 40. In this instance, it seems that the method of preparing the new template is easier than the former method.

Figure 12A:
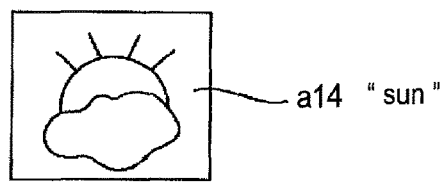
FIGS. 12A to 12C are explanatory diagrams of the printing process of a printer.
Figure 12B:
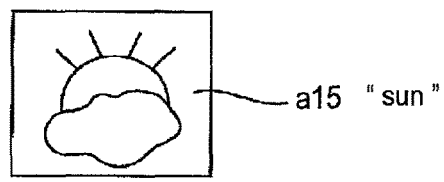
Figure 12C:
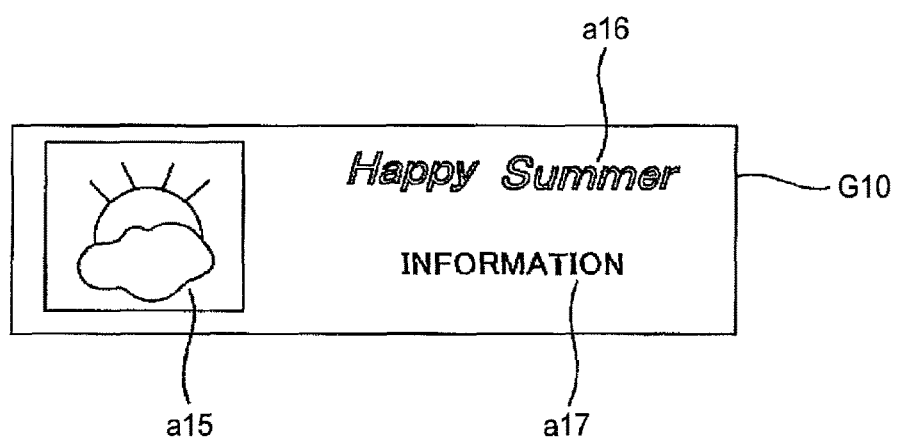

In the printing system 1, by the printing command outputted from the host computer 2, other data memorized in the printers 3 and 6 are designated together with the template, and the printers 3 and 6 can print the designated data according to the template. FIGS. 12A to 12C are explanatory diagrams of the printing process.

In addition to the image data or character data of the printing elements and the data designating a printing aspect of each printing element, the first template can contain a file name of the image data to be inserted in the template for the printing. The printer 6 stores, for example, data of an image a14 in FIG. 12A, as well as the first template. If the first template designated by the printing command outputted from the host computer 2 contains a file name "sun" of the image a14, the data of the image a14 is read, and then is printed together with other printing elements of the first template.

In this way, the second template corresponding to the first template is prepared to contain the file name "sun" of the image a14. In addition, another image a15 illustrated in FIG. 12B may be denoted by the same file name "sun" as the image a14, and then be stored in the second template storage portion 35. In this instance, characters a16 and 17 and the image a15 of the image G10 (FIG. 12C) to be printed in practice may be changed in characters and image different from the original first template, without changing the printing command and the data outputted from the host computer 2. Further, like the above example, since the second template newly contains data designating printing colors of the characters a16 and 17 and the image a15, it is possible to easily print the colorized label.

Further, if the data outputted from the host computer 2 does not contain the file name of the image data, but the first template contains the file name, as illustrated in FIG. 12B, it is not necessary to denote the image data to be newly used by the same file name. The second template storage portion 35 should be stored with the image data of the same file name as that contained in the second template.

Second Exemplary Embodiment

Next, a second exemplary embodiment will be described herewith.

In the second embodiment, the same reference sign is assigned to a component which is common to the aforementioned first embodiment.

In the first embodiment, the template terminal 5 receives the first template transmitted from the printer 3. Then, as necessary, the template terminal 5 replaces the printing element data with another printing element data and adds another printing element data. In the second embodiment, the template terminal 5 executes the process explained in the first embodiment and performs change or addition of an attribute, which is not defined in the first template, designating the printing form of the whole page.

Figure 13:
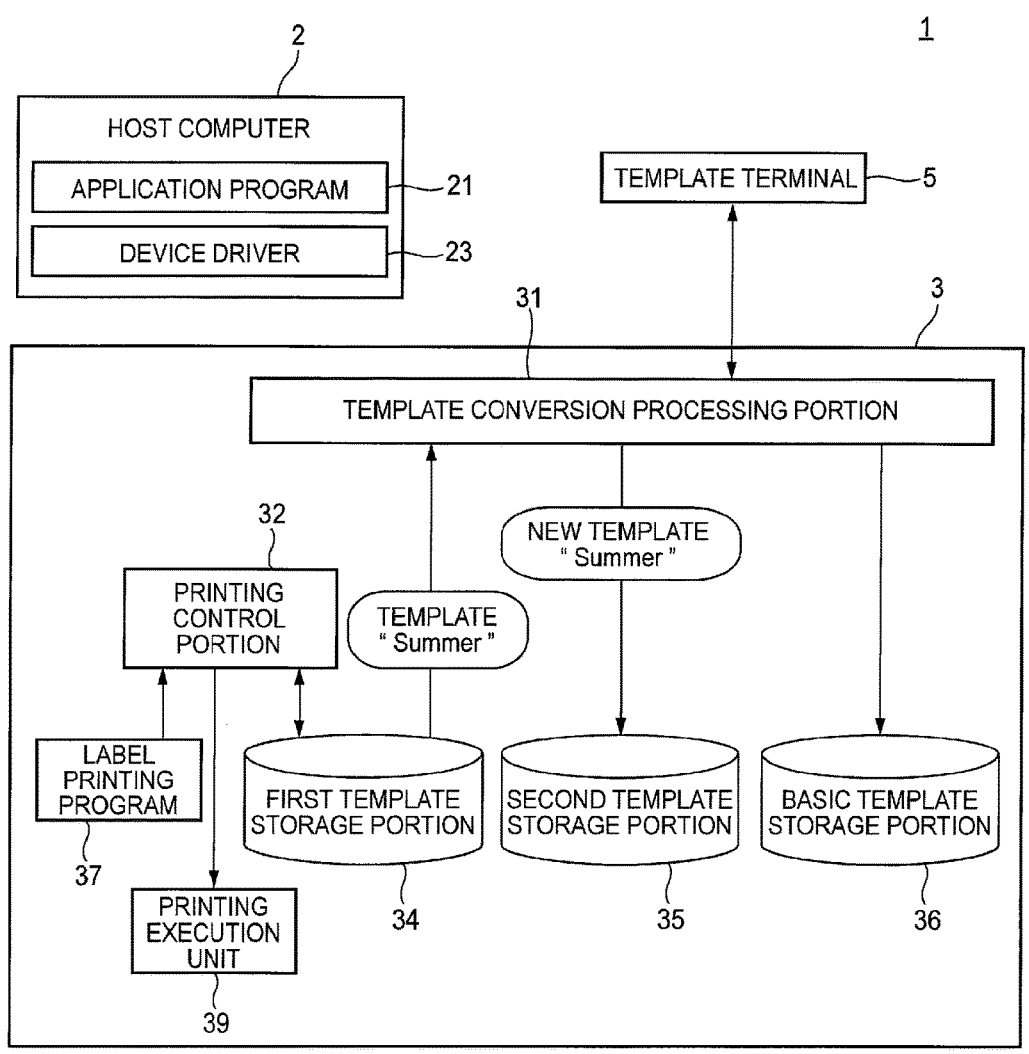
FIG. 13 is an explanatory diagram illustrating an operation of a template conversion process in a second exemplary embodiment.
Figure 14:
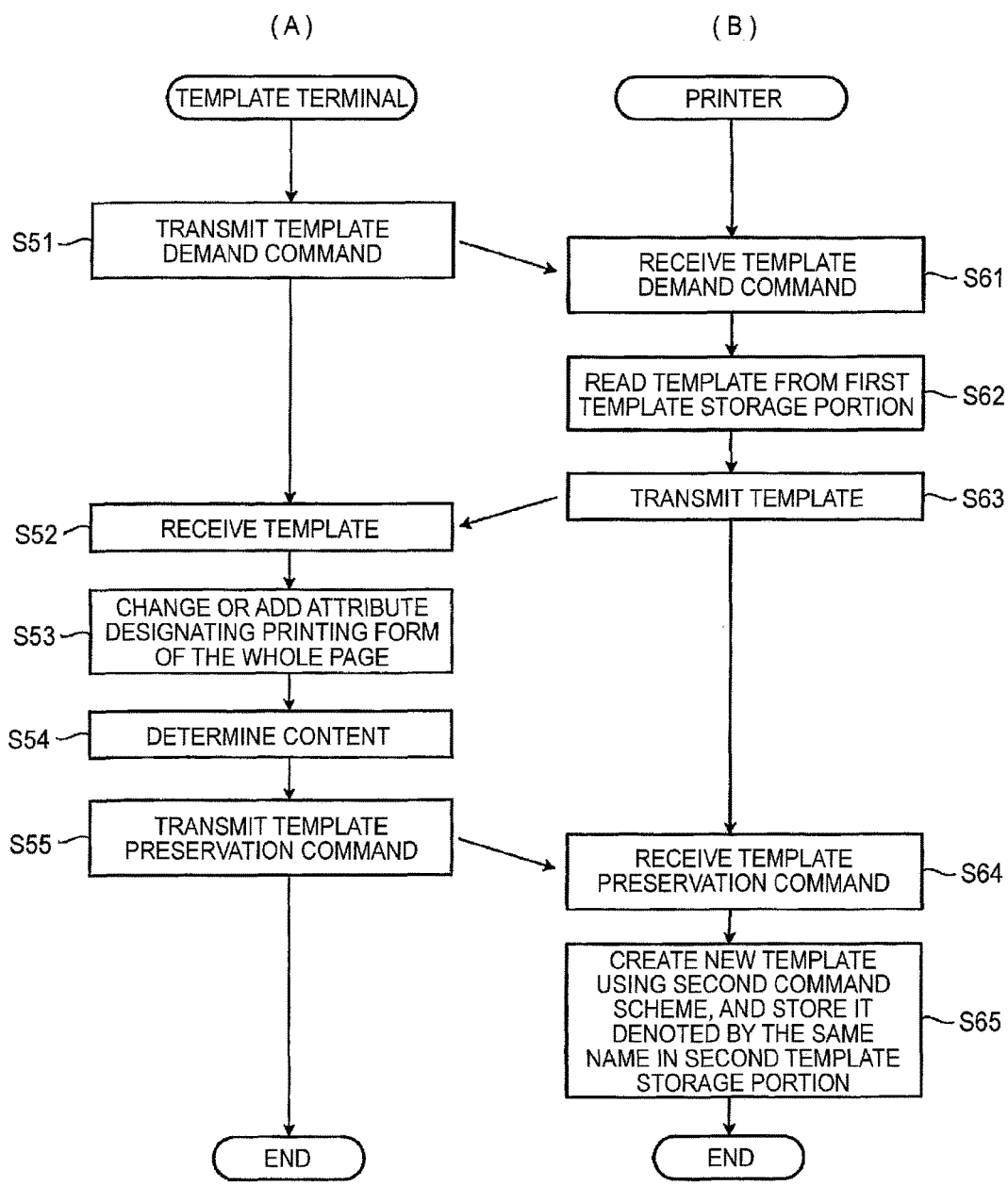
FIG. 14 is an explanatory diagram illustrating a sequence of the template conversion process.

FIG. 13 is an explanatory diagram illustrating the operation of the template conversion process in the second exemplary embodiment, and schematically shows the flow of the data in the printing system 1. Further, FIG. 14 is an explanatory diagram illustrating a sequence of the template conversion process in the second exemplary embodiment, in which FIG. 14A shows the operation of the template terminal 5, and FIG. 14B shows the operation of the template conversion processing portion 31 of the printer 3. The template conversion process will now be described with reference to FIGS. 13 and 14.

In the template conversion process, the template terminal 5 and the printer 3 transmit and receive the data to and from each other. The template conversion processing portion 31 executes, for example, the function of a web server, and the template terminal 5 executes, for example, the function of a web client. In this instance, the template conversion processing portion 31 transmits the data of a web page for the template process in response to the access of the template terminal 5, and the template terminal 5 transmits a request to the printer 3 based on the web page. In this instance, the function of the template terminal 5 may be added to the printer 5.

By manipulation of a user or operation of a preset program, the template terminal 5 transmits a template demand command for demanding transmittance of the first template to the template conversion processing portion 31 of the printer 3 (step S51). The template terminal 5 may demand transmittance of any one of the first templates stored in the first template storage portion 34, or demand transmittance of all the first templates. The template conversion processing portion 31 of the printer 3 receives the template demand command transmitted from the template terminal 5 (step S61). The template conversion processing portion 31 reads the first template demanded for the transmittance in the template demand command from the first template storage portion 34 (step S62), and transmits it to the template terminal 5 (step S63). As illustrated in FIG. 13, the first template denoted by a name "Summer" is transmitted to the template terminal 5 by way of example herein.

The template terminal 5 receives the first template transmitted from the printer 3 (step S52). The template terminal 5 performs change or addition of an attribute, which is not defined in the first template, designating the printing form of the whole page (step S53). For example, the change or addition of an attribute, which is not defined in the first template, designating the printing form of the whole page includes designation of a background color of the whole page, designation of a color background image constituting the whole page, and designation of the color of the printing element disposed at a foreground inside the page. As necessary, the template terminal 5 exchanges the data of the printing element (data of characters or data of images) by data of other printing element, or adds the data of the printing element. In this instance, the template terminal 5 sets the attribute, for example, whether or not color printing is performed for each data of the printing elements, as necessary.

If the content of the change or addition of the attribute which is performed on the whole page of the first template being processed is determined (step S54), the template terminal 5 transmits a template preservation command for making the printer 3 to preserve a new template containing the above-described attribute (step S55). In step S54, the template terminal 5 newly adds a background color of the whole page as the attribute which is set by the command constituting the first template. Also, the template terminal 5 transmits the data (containing the command) designating the attribute which is newly designated to the command constituting the first template to the printer 3 together with the template conversion command. In step S55, the template terminal 5 may transmit it together with the processed first template which is subjected to the process of designating the attribute. In the case of editing or exchanging the data of the printing element, the template terminal 5 transmits it together with the data of the processed printing element.

The template conversion processing portion 31 of the printer 3 receives the template conversion command transmitted from the template terminal 5 (step S64). The template conversion processing portion 31 creates and preserves the second template by the command defined by the second command scheme, based on the data transmitted together with template preservation command from the template terminal 5 (step S65). Specifically, the template conversion processing portion 31 creates the second template which describes the printing form using the command of the second command scheme, the printing form being reflected by the attribute designating the background color of the whole page added or changed by the process of the template terminal 5 to or from the printing form of the first template which is processed by the process of the template terminal 5. The template conversion processing portion 31 denotes the created second template by the same name as the first template processed by the template terminal 5, and stores it in the second template storage portion 35. Accordingly, it becomes clear that the second template created by the template conversion processing portion 31 in step S65 is the template to be used instead of the first template processed by the template terminal 5.

Now, the first and second templates in a corresponding relation and an example of printing images based on these templates will be described.

FIG. 5 is an explanatory diagram illustrating one example of the first template T2 and the second template T3 in the corresponding relation, in which FIG. 5A schematically shows the configuration of the first template T12 and the printing image G12 based on the first template T12, and FIG. 5B schematically shows the configuration of the second template T13 and the printing image G13 based on the second template T13.

The first template T12 is composed of a command of the monochrome printing. The first template T12 does not contain the data designating a color (background color) of a background 51 of a label 50 which is an object to be printed. The first template T12 is a template used when the label is printed by the printer 6, and the background 151 is white, that is, the background should not be printed, since the printer 6 does not perform the color printing.

The first template T12 is data designating the printing form of the label 150, and contains data 140*a* and 140*b* of a character input area which is disposed in the label 150 and is inputted by the character, and image attribute designating data 141 designating the printing form of the image to be printed on the label 150.

The character input area is a region in which the character data outputted from the host computer 2 together with the command of the printing instruction is inserted. In this embodiment, a character string "HAPPY" and a character string "Summer Festival" are output from the host computer 2, and these character strings are input in each character input area. As a result, as illustrated in the printing image G12 of FIG. 15A, a character string y1 composed of characters "HAPPY" and a character string y2 composed of characters "Summer Festival" are printed.

Data 140*a* and 140*b* of the character input area contained in the first template T12 contain a command and data designating a size, a position, and a font of the character. The character string y1 is printed on the label 150 in the printing form designated by the data 140*a* of the character input area, and the character string y2 is printed on the label 150 in the printing form designated by the data 140*b* of the character input area.

The image attribute designating data 141 contains data designating the image to be printed on the label 150. The image is selected from the images stored in the first template storage portion 34 together with the first template T12. The data designating the image is a file name of the image data, for example. As illustrated in the printing image G12 of FIG. 15A, the image x5 designated by the image attribute designating data 141 is printed on the label 150 to form the foreground.

Figure 15A:
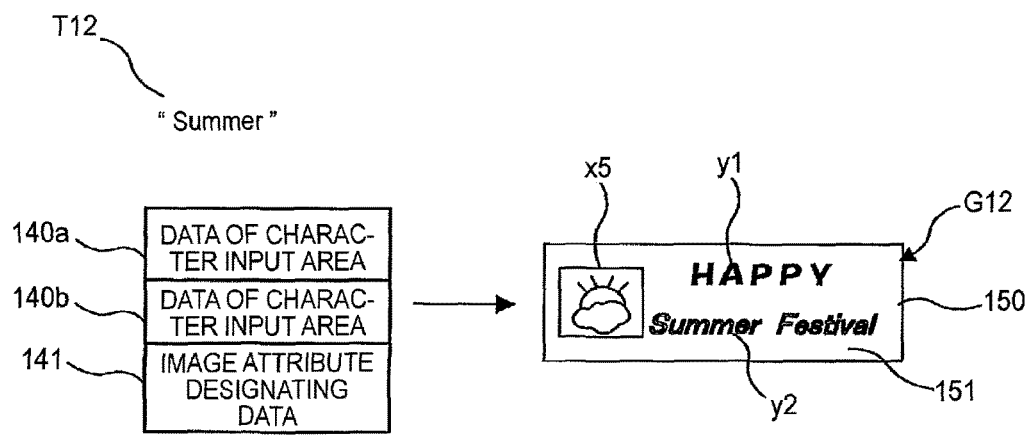
FIGS. 15A and 15B are explanatory diagrams illustrating one example of first and second templates.
Figure 15B:
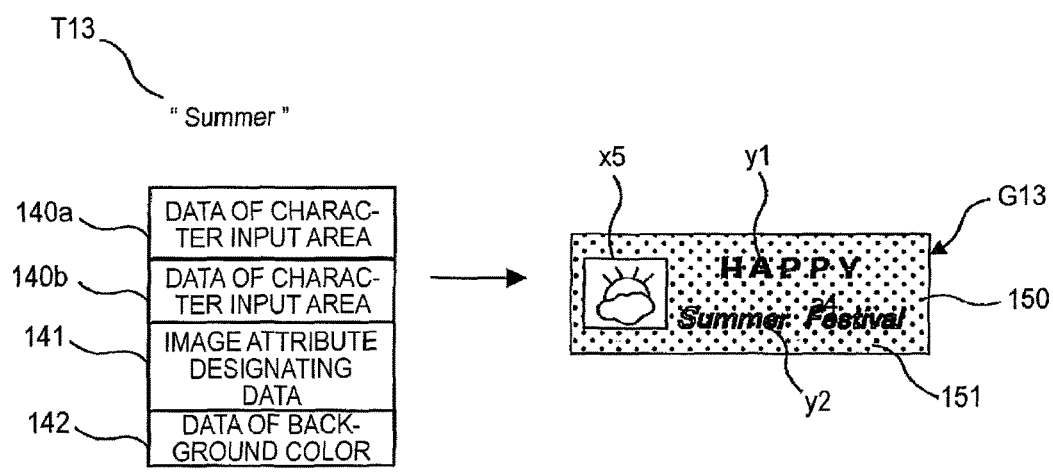

The second template T13 illustrated in FIG. 15B is that data 142 of the background color is added to the data of the corresponding first template T12. The data 142 of the background color is data designating the background color for every page of the label 150 which is a printing unit. The data 140*a* and 140*b* of the character input area of the second template T13 may contain data designating colors of the character strings y1 and y2 to be printed, and data designating a background color inside the area.

In the printing image G13 based on the second template T13, the background is colorized by the color designated by the data 142 of the background color. Further, in the printing image G13, the character strings y1 and y2 and the image x5 are printed in the printing form designated by the data 140*a* and 140*b* of the character input area and the image attribute designating data 141, as well as the printing image G12.

As the template terminal 5 converts the first template T12 used by the printer 6 into the second template T13 described by the command of the second command scheme which can be executed by the printer 3, and then preserves it in the printer 3, the printer 3 can perform the printing using the function of the color printing or the like, which cannot be executed by the printer 6, thereby colorizing the background color on the whole page of the label 150 which is the printing unit.

Figure 16:
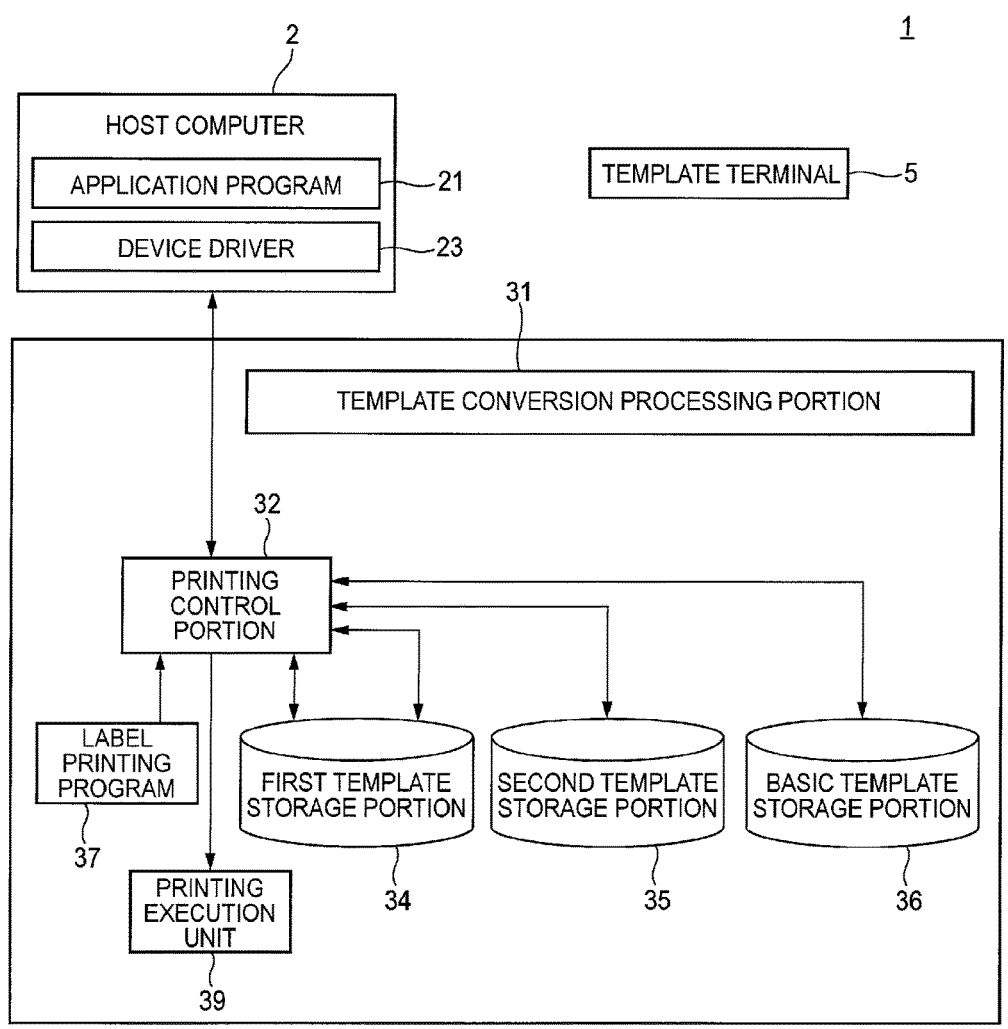
FIG. 16 is an explanatory diagram illustrating an operation of a printing process.

FIG. 16 is an explanatory diagram illustrating the operation of the printing process, and schematically shows the flow of the data in the printing system 1. Further, FIG. 7 is an explanatory diagram illustrating a sequence of the printing process, in which FIG. 17A shows the operation of the host computer 2, and FIG. 17B shows the operation of the printing control portion 32 of the printer 3.

Figure 17:
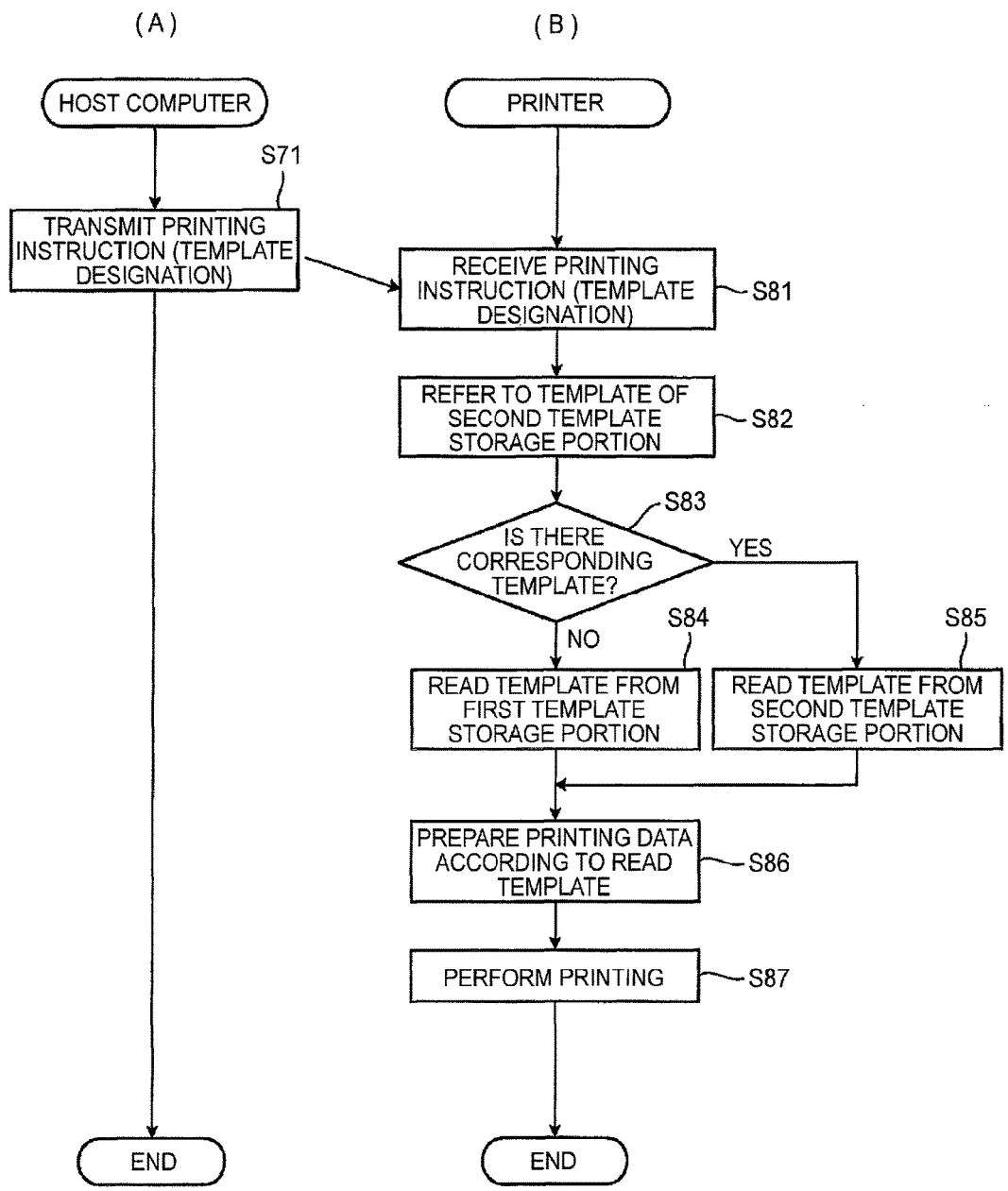
FIG. 17 is an explanatory diagram illustrating a sequence of the printing process.

The printing process will now be described with reference to FIGS. 16 and 17.

In the printing process, the host computer 2 and the printer 3 transmit and receive the data to and from each other. In a case where the host computer 2 and the printer 3 are connected one-on-one via a communication line, such as USB or RS-232C, the printing process is executed via the communication line.

As the host computer 2 executes the application program 21 by the manipulation of the user or the operation of the preset program, the printing process starts. If the application program 21 creates the printing data of the label and instructs the printing execution, the printing command contained the data designating the first template based on the first command scheme is created and transmitted to the printer 3 by the device driver 23 (step S71).

The printing control portion 32 of the printer 3 receives the printing command transmitted from the host computer 2 (step S81). The printing control portion 32 refers to the data of the second template stored in the second template storage portion 35 (step S82), and verifies whether or not the second template storage portion 35 is stored with the second template corresponding to the first template designated by the printing command (step S83). That is, the printing control portion 32 searches whether the second template having the same name as the template contained in the printing command is in the first storage portion 35.

If the concerned second template is not in the second template storage portion 35 (NO in step S83), the printing control portion 32 reads the designated first template from the first template storage portion 34 (step S84), and proceeds to step S46. If there is no concerned first template in the first template storage portion 34, the printing control portion 32 may read the basic template from the basic template storage portion 36. Further, if it is verified that the concerned second template is in the second template storage portion 35 (YES in step S83), the printing control portion 32 reads the second template from the second template storage portion 34 (step S85), and proceeds to step S86.

In step S86, the printing control portion 32 creates the printing data according to the read template. For example, if the first template designated in the printing command is denoted by the name of "Summer", the template having the same template name "Summer" is read from the second template storage portion 35, and the printing data is created. The read second template is to designate the background color of the whole page which is the printing unit, on the label 150 which is the object to be printed in the first template.

In steps S82 to S86, the printing control portion 32 converts the command of the first command scheme which is the command scheme of the printer 6 into the command of the second command scheme which is the command scheme of the printer 11, and operates as an emulator for controlling the recording of the printer 11.

Subsequently, the printing control portion 32 controls the printing execution unit 39 to execute the printing of the label 150 based on the printing form designated by the second template (step S87).

As described above, if the printing command designating the first template is input, the printer 3 performs the printing based on the second template corresponding to the first template. That is, at the time of printing, the printer 3 substitutes the first template designated in the printing command for the printer 3 by the second template T13, and then performs the printing. Since the second template contains the information designating the attribute of the background color of the whole page, the printer 3 can perform the printing in a printing form different from the printing form based on the first template. For this reason, as the printer 6 is substituted by the printer 3, it is possible to designate the background color of the label 150, without changing the printing command to be output from the host computer 2, thereby widening the range of the output representation of the label 150.

Further, if there is no second template corresponding to the first template designated by the host computer 2, the printer 3 takes the designated first template for the recording, thereby implementing the printing even with no the second template corresponding to the designated first template. Therefore, it does not need to prepare the second template corresponding to all the first templates. For this reason, the recording form can be changed so that the second template is used for only a portion of the first template. Therefore, limitation on the change of the printing form is alleviated, and thus the printing form can be easily changed.

Although one example of the first and second templates has been described with reference to FIGS. 15A and 15B in the above description, the present disclosure is not limited thereto. Another example of the first templates and an example of a second template corresponding to each first template will be described with reference to FIGS. 18 and 19.

Figure 18A:
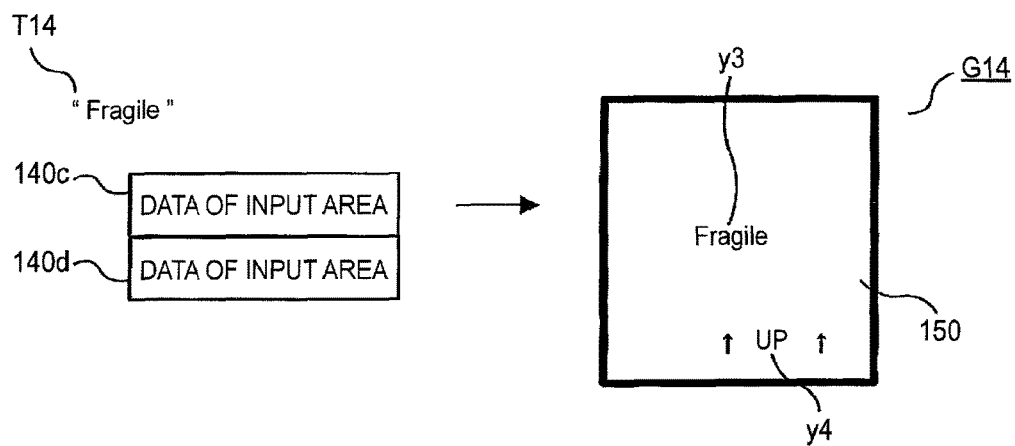
FIGS. 18A and 18B are explanatory diagrams illustrating one example of first and second templates.
Figure 18B:
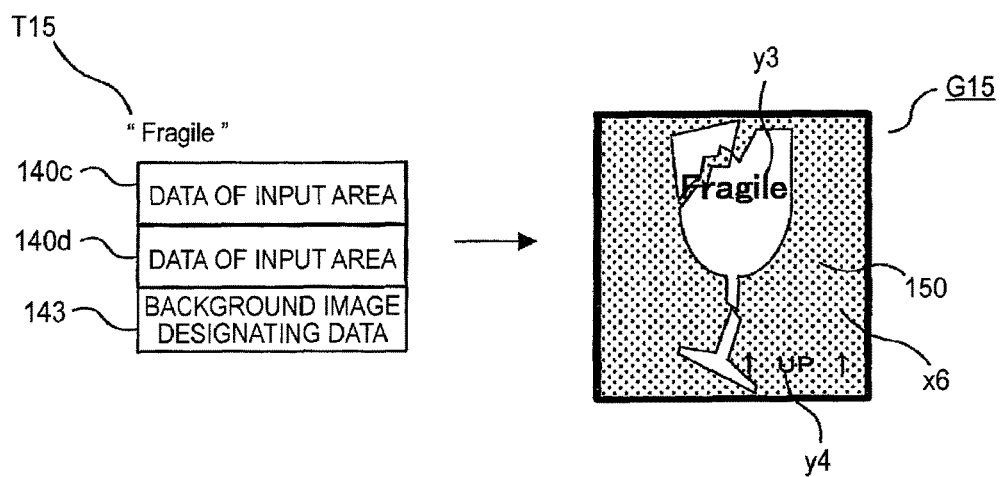

FIG. 18A is a view illustrating another example of the first template and the second template, in which FIG. 18A shows a first template T14 and a printing image G14 based on the first template T14, and FIG. 18B shows a second template T15 and a printing image G15 based on the second template T15.

The first template T14 is composed of a command of gray scale printing, and is denoted by a name "Fragile".

The first template T14 contains data 140c and 140d of input areas designating the printing form of the character input area provided in the label 150, and data (not illustrated) designating the printing form of the frame to be printed on an edge of the label 150. The data 140c and 140d of the input area contain data designating a size, a position, and a font of the characters inputted in the character input area, and a command and data designating printing density of the characters. In this instance, the characters inputted in the input areas are characters outputted from the host computer 2 together with the printing instruction, as described above. In the example of FIG. 18A, the characters are composed of "Fragile" (character string y3) and "↑ UP ↑" (character string y4). In the printing image G14, the character strings y3 and y4 are printed on the label 150 in the gray scale according to the data 140c and 140d of the input area.

The second template T15 is that the first template T14 is added by the background image designating data 143 designating the printing form of a background image x6 constituting the background of the label 150. The second template T15 is denoted by the same name as the first template T14, and is stored in the second template storage unit 35.

The background image designating data 143 is data designating the background image x6 to be printed as the background of the label 150. For example, if the second template storage portion 35 is previously stored with data of the plurality of images which can be used as the background image, the background image designating data 143 is data (e.g., file name) designating one image data from a group of these image data. In the example of FIG. 18B, the background image designating data 143 contains a file name "Image1" of the image data to be used as the background image x6, and thus the background image x6 is designated as the background image. In the printing image G15 of FIG. 18B, the background image x6 designated by the background image designating data 143 is disposed as the background of the label 150. The background image a6 is a color image.

If the printing command designating the first template T14 is outputted from the host computer 2, the printer 3 performs the printing based on the second template T15 corresponding to the first template T14. Accordingly, it is possible to print the colorized background image x6 as the background of the page of the label 150, thereby widening the range of the output representation of the label 150.

Figure 19A:
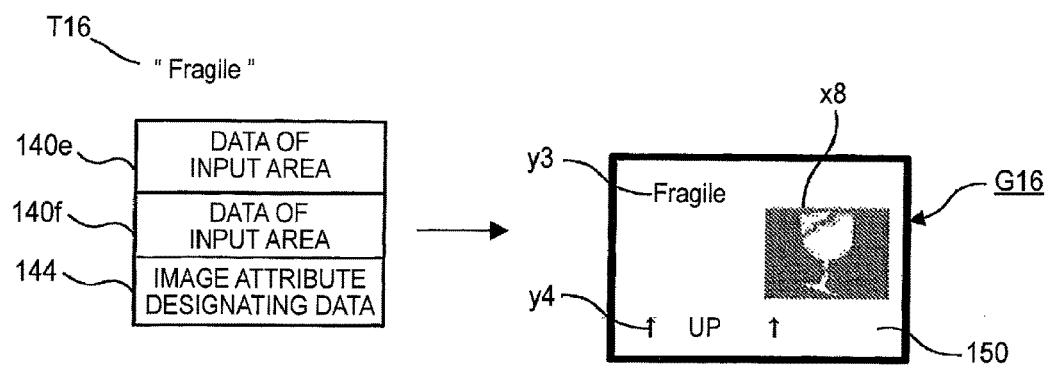
FIGS. 19A and 19B are explanatory diagrams illustrating one example of first and second templates.
Figure 19B:
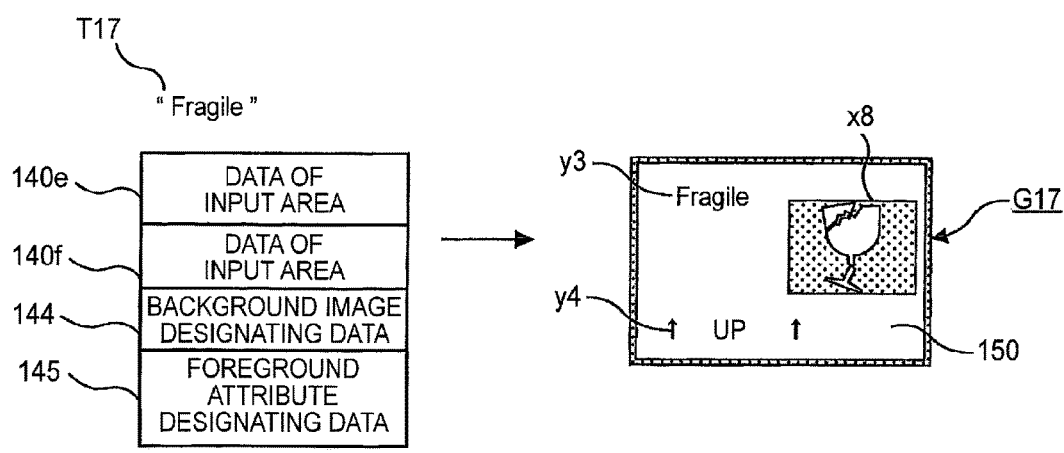

FIGS. 19A and 19B are views illustrating another example of the first template and the second template, in which FIG. 19A shows a first template T6 and a printing image G6 based on the first template T6, and FIG. 19B shows a second template T17 and a printing image G17 based on the second template T17.

The first template T16 of FIG. 19A is composed of a command of gray scale printing. The first template T16 contains data 140e and 140f of input areas designating the printing form of the character input area in the label 150 as the data designating the printing form, and image attribute designating data 144 designating the printing form of the image to be printed on the label 150. The data 140c and 140d of the input area contain data designating a size, a position, and a font of the characters, like the data 140b and 140c of the input area. In the example of FIG. 19A, the characters to be input in the character input area are "Fragile" (character string y3) and "↑ UP ↑" (character string c4) outputted from the host computer 2.

The image attribute designating data 144 is data designating an image x8 to be printed on the label 150. For example, if the storage portion 33 is previously stored with data of the plurality of images which can be used as the image for the label, the image attribute designating data 144 is data (e.g., file name) designating one image data from a group of these image data.

The second template T17 is that the first template T16 is newly added by a foreground attribute designating data 145 designating the printing color of the printing element, such as an image x8 and characters y3 and y4 which constitute the foreground. In other words, the foreground attribute designating data 145 is data designating the foreground color of the label 150 in a lump. The foreground attribute designating data 145 may be data designating one color in the whole page, or data designating the plurality of different colors for every portion. If the second template T17 is used, it is possible to print the characters y3 and y4 or the image x8 in color, like the printing image G17 of FIG. 19B.

Preferred embodiments of the disclosure have been described above, but the present disclosure is not limited thereto. For example, although the above embodiment has been explained in which the second template stored in the second template storage portion 35 provided in the printer 3 is denoted by the same name as the corresponding first template to make the first template correspond to the second template, the present disclosure is not limited thereto. The information defining the correspondence between the first template and the second template may be stored in the storage unit 33 or other storage units. In this instance, the printing control portion 32 selects the second template corresponding to the first template designated by the printing command sent from the host computer 2 on the basis of the information, and it is not necessary to make the names of the templates same.

Further, in the above embodiments, for example, it has been described the configuration of taking the first template from the first template storage portion 34 to create the printing data if the second template corresponding to the first template in the printing command is not stored in the second template storage portion 35. It is possible to create the printing data by determining whether the first template or the second template is used by use of the contents of the data sent together with the printing command, or parameters of the command contained in the printing command, and then selectively using the first template and the second template.

Although the above embodiments have been described using the case where the label is printed by the printer 3, the present disclosure can be applied to a case where the record is recorded by using other printing mediums or recording mediums.

In addition, the function blocks shown in each block diagram are achieved by cooperation between hardware and software, but the specifics of the hardware and software configurations can be determined as desired, and other detailed aspects of the configuration can be changed as desired. The printer 3 is not specifically limited to a specific configuration if it can perform the printing, and can be applied to various devices, such as a SIDM type printer, an inkjet type printer, a thermal printer, or a laser printer. Of course, the present disclosure is not limited to stand-alone devices, and the disclosure can obviously be applied to devices that are incorporated into another device such as an ATM (automated teller machine) or cash dispenser. The data processing device of the present disclosure is not limited to the printer 3 including the printing control portion 32 as the processing unit, and can be applied to a device which creates the printing data using an apparatus installed separately from the printer 3.

EXPLANATION OF REFERENCE SIGNS 1 printing system
2 host computer
3 printer (recording device)
34 first template storage portion (first storage unit)
32 printing control portion (recording control unit)
35 second template storage portion (second storage unit)
39 printing execution unit (recording unit)
T2, T6, T8, T12, T14, T16 first template
T3, T4, T5, T7, T9, T13, T15, T17 second template

What is claimed is:
1. A printing device comprising:
a printing mechanism configured to perform a printing operation;
a storage configured to store data related to the printing operation; and
a controller configured to receive a printing instruction, and cause the printing mechanism to perform the printing operation based on the received printing instruction and the data stored in the storage, wherein, the controller:
receives the printing instruction containing a template command designating a first template, verifies whether a second template corresponding to the command designating the first template and the first template are stored in the storage or not, based on the received printing instruction, when the second template is stored in the storage, controls the printing mechanism based on the printing instruction and the second template, which is stored as the data in the storage corresponding to the template command designating the first template, and when the second template is not stored in the storage and the first template is stored in the storage, controls the printing mechanism based on the printing instruction and the acquired first template, and wherein the second template includes a data of a printing element designating a printing form of the printing element, and is made by changing a data of the printing element included in the first template, or by adding a data of the printing element to the first template.

2. The printing device described in the claim 1, wherein, the printing form designated by the data of the printing element included in the second template is not designated by the data included in the first template.

3. The printing device described in the claim 1, wherein, the second template contains data designating a printing color of a printing element, as the data designating a printing form of the data of the printing element.

4. The printing device described in the claim 1, wherein, a name of the second template includes a part of the name of the first template.

5. The printing device described in the claim 4, wherein, the first template corresponding to first command scheme and the second template corresponding to second command scheme.

6. A control method of controlling a printing device, the control method comprising:

receiving a printing instruction containing a template command designating a first template, verifying whether a second template corresponding to the command designating the first template and the first template are stored in a storage or not, based on the received printing instruction, when the second template is stored in the storage, performing a printing operation on the printing device based on the received printing instruction and the acquired second template, and when the second template is not stored in the storage and the first template is stored in the storage, performing a printing operation on the printing device based on the received printing instruction and the acquired second template, wherein the second template includes a data of a printing element designating a printing form of the printing element, and is made by changing a data of the printing element included in the first template, or by adding a data of the printing element to the first template.

7. The control method according to claim 6, wherein, the printing form designated by the data of the printing element included in the second template is not designated by the data included in the first template.

8. The control method according to claim 6, wherein, the second template contains data designating a printing color of a printing element, as the data designating a printing form of the data of the printing element.

9. The control method according to claim 6, wherein, a name of the second template includes a part of the name of the first template.

10. The control method according to claim 9, wherein, the first template corresponding to first command scheme, and the second template corresponding to second command scheme.

* * * * *